(12) United States Patent
Porter et al.

(10) Patent No.: US 6,500,885 B1
(45) Date of Patent: Dec. 31, 2002

(54) POLYCARBONATE-CONTAINING LIQUID CHEMICAL FORMULATION AND METHODS FOR MAKING AND USING POLYCARBONATE FILM

(75) Inventors: John D. Porter, Berkeley, CA (US); Michael P. Skinner, San Jose, CA (US); Stephanie Simmons, San Jose, CA (US)

(73) Assignees: Candescent Technologies Corporation, San Jose, CA (US); Candescent Intellectual Property Services, Inc., San Jose, CA (US)

( * ) Notice: Subject to any disclaimer, the term of this patent is extended or adjusted under 35 U.S.C. 154(b) by 0 days.

(21) Appl. No.: 09/430,799

(22) Filed: Oct. 29, 1999

Related U.S. Application Data

(63) Continuation-in-part of application No. 08/808,363, filed on Feb. 28, 1997, now Pat. No. 6,180,698.

(51) Int. Cl.[7] .................................................. C08K 5/34
(52) U.S. Cl. ........................... 524/94; 524/99; 524/104; 524/114; 524/464
(58) Field of Search ........................... 524/94, 99, 104, 524/114, 464

(56) References Cited

U.S. PATENT DOCUMENTS

| | | | |
|---|---|---|---|
| 3,303,085 A | 2/1967 | Price et al. | |
| 3,612,871 A | 10/1971 | Crawford et al. | 250/83 |
| 4,791,016 A | 12/1988 | Schulte et al. | 428/220 |
| 5,041,469 A | 8/1991 | Hostetler et al. | 521/189 |
| 5,084,550 A | 1/1992 | Pakull et al. | 528/204 |
| 5,266,617 A | 11/1993 | Han | 524/392 |
| 5,427,998 A | 6/1995 | Umemura et al. | 503/227 |
| 5,468,324 A | 11/1995 | Hong | 156/247 |
| 5,559,389 A | 9/1996 | Spindt et al. | 313/310 |
| 5,564,959 A | 10/1996 | Spindt et al. | 445/24 |
| 5,766,446 A | 6/1998 | Spindt et al. | |
| 5,893,967 A | 4/1999 | Knall et al. | |
| 5,972,235 A | 10/1999 | Brigham et al. | 216/49 |
| 6,007,695 A | 12/1999 | Knall et al. | 205/657 |
| 6,096,852 A | 8/2000 | Lensvelt et al. | 528/196 |
| 6,120,674 A | 9/2000 | Porter et al. | 205/640 |
| 6,180,698 B1 * | 1/2001 | Porter et al. | 524/94 |

FOREIGN PATENT DOCUMENTS

| | | | |
|---|---|---|---|
| DD | 59169 A | 12/1967 | |
| DE | 27 01 173 A1 | 7/1978 | |
| EP | 0 084 578 A1 | 8/1983 | |
| EP | 0 141 310 B1 | 5/1985 | |
| EP | 0 141 310 A2 | 5/1985 | |
| EP | 0 219 626 A2 | 4/1987 | |
| EP | 0 352 765 | 1/1990 | C08J/5/18 |
| EP | 0 380 028 A2 | 8/1990 | |
| EP | 0 380 028 A3 | 8/1990 | |
| EP | 500 128 B1 | 8/1992 | |
| EP | 0 500 131 | 8/1992 | C08J/5/18 |
| FR | 2 705 830 | 12/1994 | H01J/9/02 |
| GB | 1122003 | 7/1968 | |
| GB | 1592724 | 7/1981 | |
| WO | WO 90/05203 | 5/1990 | |
| WO | WO 94/28569 | 12/1994 | |
| WO | WO 95/07543 | 3/1995 | |

OTHER PUBLICATIONS

Apai et al., "Surface Analysis of Polycarbonate Thin Films by High–Resolution Electron Energy Loss Spectroscopy: Negative Ion Resonances and Surface Vibrations," *Langmuir*, vol. 7, 1991, pp. 2266–2272.

Archer, *Industrial Solvents Handbook* (Marcel Dekker, Inc.), 1996, pp. 1–4, 35–56, and 297–309 and diskette pp. 1–19.

Bagen, "Extrusion Coating of Polymer films for Low–Cost Flat Panel Display Manufacturing," *Dig. Tech. Paps., 1996 Display Mfg. Tech. Conf.,* vol. 3, 1996, pp. 35–36.

Barton, *CRC Handbook of Polymer–Liquid Interaction Parameters and Solubility Parameters* (CRC Press), 1990, pp. 443–444.

Blunt et al., "Production of thin metallised plastic films," *Nucl. Instr. and Meth. in Phys. Res. A,* vol. 334, 1993, pp. 251–253.

Bosch, "A charge and energy study of the track response of Lexan," *Nucl. Instr. and Meth. in Phys. Res. B,* vol. 84, 1994, pp. 357–360.

Bosch et al., "A study of the dependence of the bulk etch rate and the reduced etch rate on the concentration of etched products of Lexan," *Nucl. Instr. and Meth. in Phys. Res. B,* vol. 93, 1994, pp. 57–62.

Budavari et al., *The Merck Index* (12th ed., Merck & Co.), 1996, p. 215.

Busta, "Vacuum Microelectronics—1992," *J. Micromech. Microeng.* vol. 2, 1992, pp. 43–74.

(List continued on next page.)

*Primary Examiner*—Edward J. Cain
(74) *Attorney, Agent, or Firm*—Skjerven Morrill LLP; Ronald J. Meetin

(57) ABSTRACT

A liquid chemical formulation suitable for making a thin solid polycarbonate film contains polycarbonate material and a liquid typically capable of dissolving the polycarbonate material to a concentration of at least 1%. The polycarbonate material may consist of homopolycarbonate or/and copolycarbonate. Examples of the liquid include pyridine, a ring-substituted pyridine derivative, pyrrole, a ring-substituted pyrrole derivative, pyrrolidine, a pyrrolidine derative, chlorobenzene, and cyclohexanone. A liquid film (36A) of the formulation is formed over a substructure (30) and processed to remove the liquid. The resultant solid polycarbonate film can later serve as a track layer through which charged particles (70) are passed to form charged-particle tracks (72). Apertures (74) are created through the track layer by a process that entails etching along the tracks. The aperture-containing polycarbonate track layer is typically used in fabricating a gated electron-emitting device.

112 Claims, 7 Drawing Sheets

OTHER PUBLICATIONS

Cowie, *Polymers: Chemistry & Physics of Modern Materials,* (2d ed., Blackie Academic & Professional), 1991, pp. 1–25, 157–213, and 247–273.

Cowie, *Polymers: Chemistry & Physics of Modern Materials,* (2d ed., Blackie Academic & Professional), 1991, pp. 104, 105, 115–120, and 350–355.

Domininghaus, *Plastics for Engineers: Materials, Properties, Applications* (Carl Hanser Verlag), 1993, pp. 423–441, translated and revised by Haim et al. from *Die Kunstoffe und ihre Eigenschaften* (3d ed., VDI–Verlag GmbH), 1988.

Fischer et al., "Production and use of nuclear tracks: imprinting structure on solids," *Reviews of Modern Physics,* vol. 55, No. 4, Oct. 1983, pp. 907–948.

Fréchet et al., "New Condensation Polymers as Resist Materials Capable of Chemical Amplification" *Procs. 192nd ACS Symp. Polymeric Materials Sci. & Engrg.,* 1986, pp. 299–303.

Fréchet et al., "Thermally Depolymerizable Polycarbonates V. Acid Catalyzed Thermolysis of Allylic and Benzylic Polycarbonates: A New Route to Resist Imaging," *Polymer J.,* vol. 19, No. 1, 1987, pp. 31–49.

Hoffman, "Inorganic membrane filter for analytical separations," *American Laboratory,* Aug. 1989, pp. 70–73.

Hosokawa et al., "Bright blue electroluminescence from hole transporting polycarbonate," *Appl. Phys.*

Huizenga, et al., "Submicron entrance window for an ultrasoft x–ray camera," *Rev. Sci. Instrum.,* vol. 52, No. 5, May 1981, pp. 673–677.

Kambour et al., "Bisphenol–A Polycarbonate Immersed in Organic Media Swelling and Response to Stress," *Macromolecules,* vol. 7, No. 2, Mar.–Apr. 1974, pp. 248–253.

Kent, "EUV Band Pass Filters for the ROSAT Wide Field Camera," *Proceedings, SPIE,* vol. 1344, 1990, pp. 255–266.

Nakamura et al., "Photocurrent of Solution–Grown Thin Polycarbonate Films Containing Soluble Nickel–Phthalcyanine," *Japanese Journal of Applied Physics,* vol. 28, No. 6, Jun. 1989, pp. 991–995.

Shriver et al., *The Manipulation of Air–Sensitive Compounds* (2d ed., John Wiley & Sons) 1986, pp. 84–96.

Skinner, "A Study of the Thermal Stability of Cardo–Polymers and Their Electronic Susceptibility to the Capto Dative Effect," Ph.D. dissertation, Polytechnic Univ., Jun. 7, 1993, cover p. and pp. 21–36 and 55–58.

Spohr, *Ion Tracks and Microtechnology, Principles and Applications* (Viewig), edited by K. Bethge, 1990, pp. 246–255.

Stevens, *Polymer Chemistry, An Introduction* (2d ed., Oxford University Press), 1990, pp. 28, 344, 345, 394, 395, and 400–403.

Stoner, "Casting thin films of cellulose nitrate, polycarbonate, and polypropylene," *Nucl. Instr. and Meth. in Phys. Res. A,* vol. 362, 1995, pp. 167–174.

Streitwieser et al., *Introduction to Organic Chemistry* (3d ed., Macmillan Publishing Co.), 1985, pp. 10–15.

Su, "Comparison of Chemical Etching with the Alkali–Alcohol Mixture and the Ultrasonic Etchings of Fission Fragment and Alpha Particle Tracks in Lexan Polycarbonates," *Radiation Effects and Defects in Solids,* vol. 114, 1990, pp. 157–166.

*CRC Handbook of Chemistry and Physics* (65th ed., CRC Press), 1984, pp. C–137, C–541, C–572, and C–573.

"Handling air–sensitive reagents," *Tech. Bull. AL–134,* Aldrich Chemical Co., Dec. 1994, 8 pages.

"Instruments for Research, Industry, and Education," catalog, Cole–Parmer Instrument Co., 1991–1992, pp. 663–665, 772, and 773.

*1990 Nuclepore Laboratory Products Catalog,* 1990, cover page and pp. 3, 8, and 9.

* cited by examiner

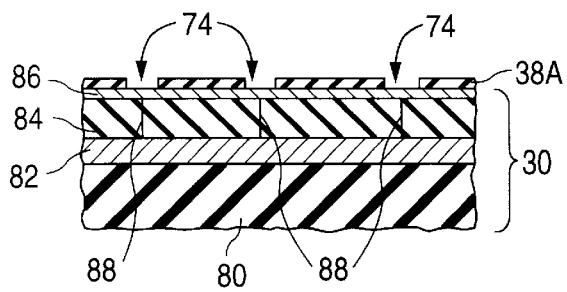
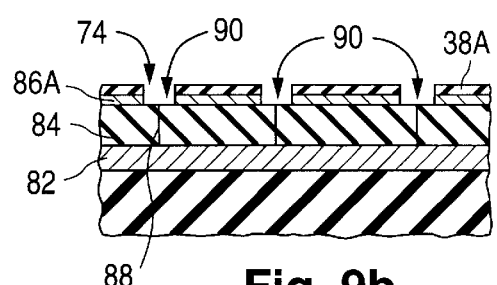
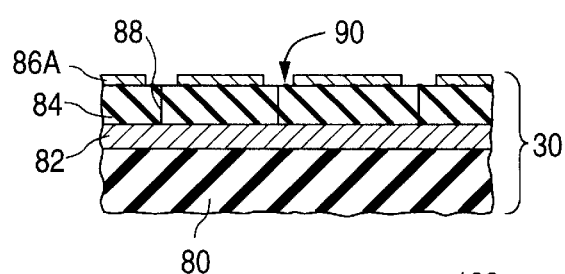
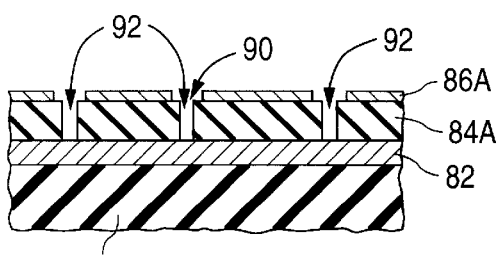
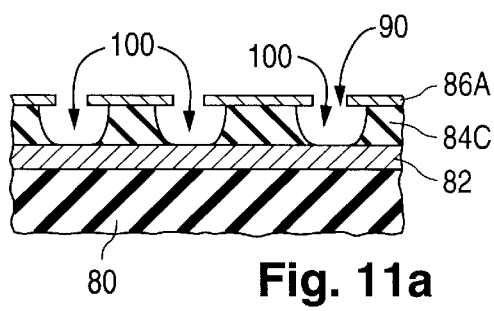
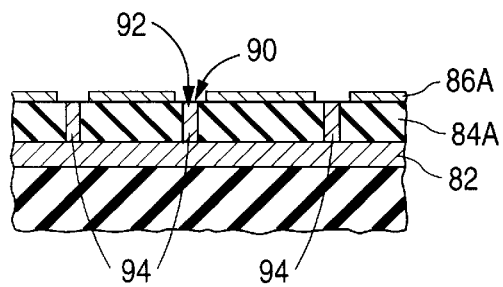
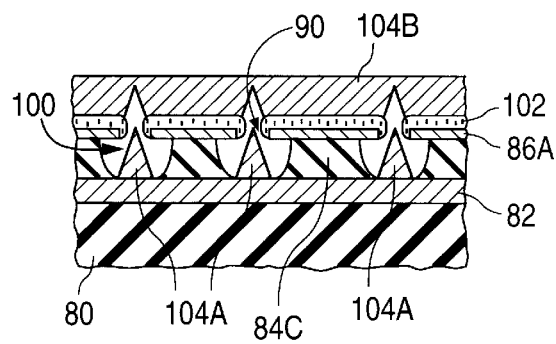
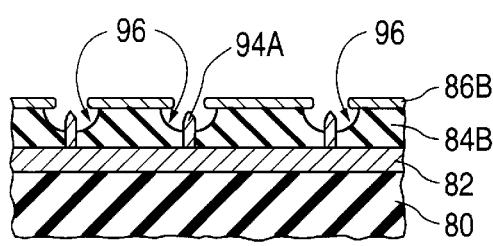
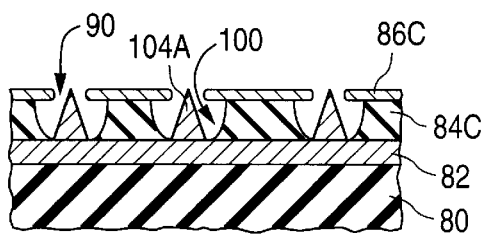

POLYCARBONATE-CONTAINING LIQUID CHEMICAL FORMULATION AND METHODS FOR MAKING AND USING POLYCARBONATE FILM

CROSS REFERENCE TO RELATED APPLICATION

This is continuation-in-part of U.S. patent application Ser. No. 08/808,363, filed Feb. 28, 1997, now U.S. Pat. No. 6,180,698, the contents of which are incorporated by reference to the extent not repeated herein.

FIELD OF USE

This invention relates to the formation of polycarbonate films, including the formation of apertures through polycarbonate films.

BACKGROUND ART

Polycarbonate is a colorless thermoplastic polymer, i.e., polycarbonate softens when heated and hardens when cooled. Polycarbonate is commonly used in applications which take advantage of its outstanding impact resistance and toughness, such as molded helmets, battery cases, bottles and packaging, and in applications which also demand optical transparency, such as bullet-proof and safety glass, eyewear, compact discs and automobile lenses. In thin-film form, polycarbonate is used for a variety of applications ranging from precision filters to electron-emitting devices.

Polycarbonate membranes used as commercial filters are described in the 1990 Nucleopore® Laboratory Products Catalog, Costar Corp., 1990, pp. 3, 8 and 9. The membranes are created by subjecting stretched, crystalline polycarbonate film to irradiation, followed by etching to form pores. The Costar process is similar to that disclosed in Price et al., U.S. Pat. No. 3,303,085. The thickness of commercial membrane filters is typically 6 to 11 $\mu$m.

Bassiere et al., PCT Patent Publication WO 94/28569, disclose how thin polycarbonate layers are used in manufacturing electron-emitting devices. In one embodiment, Bassiere et al. provide a polycarbonate layer over a sandwich consisting of an upper conductor, an insulator and a patterned lower conductor. The multi-layer structure is irradiated with heavy ions to create radiation tracks through the polycarbonate layer. The tracks are etched to form pores through the polycarbonate layer down to the upper conductor. Using suitable etchants, the pore pattern in the polycarbonate layer is transferred to the upper conductor and then to the insulator, after which conical electron-emissive elements are formed in the resulting openings in the insulator.

Bassiere et al. indicate that the thickness of their polycarbonate layer is approximately 2 $\mu$m. This is significantly less than the thickness of the commercial polycarbonate membrane filters in the Costar product catalog. While Bassiere et al. specify that the polycarbonate layer in their structure can be created by spin coating, Bassiere et al. do not provide any further information on how to make the polycarbonate layer.

Macaulay et al., PCT Patent Publication WO 95/07543, disclose a similar fabrication technique in which electron-emissive features in an electron-emitting device are defined by way of charged-particle tracks formed in a track layer. Polycarbonate is one of the materials that Macaulay et al. consider for the track layer. The thickness of the track layer in Macaulay et al. is 0.1 to 2 $\mu$m, typically 1 $\mu$m. Consequently, the thickness of the track layer in Macaulay et al. is typically less than that of the polycarbonate layer in Bassiere et al. by a factor of up to twenty.

Kanayama et al, European Patent Specification 500,128 B1, application published Aug. 26, 1992, describes a polycarbonate resin utilized in forming a solid polycarbonate film. The polycarbonate resin consists of copolycarbonate formed with repetitions of two different carbonate repeat units. The polycarbonate film is created by dissolving the copolycarbonate in a non-halogenated solvent such as toluene, xylene, or ethylbenzene, forming a liquid film of the resulting solution over a substrate, and drying the liquid film.

The solid polycarbonate film of Kanayama et al may have enhanced mechanical strength. However, the film does not appear particularly suitable for receiving a fine pattern of small generally parallel apertures created by etching along the tracks of energetic charged particles that pass through the film. For example, the carbonate ($CO_3$) groups in the repeat units do not appear to have significant free radical stabilization which would facilitate etching along the charged-particle tracks.

As film thickness is reduced, it becomes progressively more difficult to make high-quality polycarbonate films. Controlling and maintaining the uniformity of film thickness and other properties, such as density, becomes harder. Structural and compositional defects also become more problematic in very thin polycarbonate films. It would be desirable to have a method for making a thin polycarbonate film whose thickness and other physical properties are highly uniform, especially a thin polycarbonate film in which a fine pattern, such as a group of small generally parallel apertures, is to be formed. It would also be desirable to have a method for providing small parallel apertures through the film, particularly for use in defining openings in the gate layer of a gated electron emitter.

GENERAL DISCLOSURE OF THE INVENTION

The present invention involves the preparation and usage of polycarbonate films. More particularly, the invention furnishes properties and compositions for a polycarbonate-containing liquid chemical formulation from which a thin polycarbonate film of highly uniform thickness can be made. The invention also furnishes processing techniques for making the polycarbonate film. Apertures are created through a so-prepared polycarbonate film by etching along substantially parallel charged-particle tracks. The aperture-containing polycarbonate film is typically employed in fabricating a gated electron-emitting device.

The liquid chemical formulation of the invention is formed from polycarbonate material dissolved in a suitable liquid, preferably one capable of dissolving the polycarbonate material to a concentration of at least 1% by mass of the liquid formulation at 20° C. and 1 atmosphere. The liquid preferably contains a principal solvent consisting of at least one of pyridine, a ring-substituted pyridine derivative, pyrrole, a ring-substituted pyrrole derivative, pyrrolidine, a pyrrolidine derivative, chlorobenzene, and cyclohexanone. The liquid may include a cosolvent, different from the principal solvent, for modifying one or more properties of the liquid formulation.

Aside from the liquid and the polycarbonate material, the present liquid chemical formulation may be provided with one or more other constituents such as a water scavenger. To the extent that any other such constituent is present in the liquid formulation, each other such constituent is normally a minor component compared to the polycarbonate material. That is, the polycarbonate material is normally present in the liquid at a higher mass fraction than any other constituent present in the liquid.

The polycarbonate material typically includes copolycarbonate whose molecules each contain two or more different monomeric carbonate repeat units. Each carbonate repeat unit is formed with a carbonate ($CO_3$) group and another group, normally a hydrocarbon group. The copolycarbonate normally constitutes at least 5%, typically more than 50%, by mass of the polycarbonate material.

Use of copolycarbonate leads to a polycarbonate film having properties that are highly advantageous when apertures are created in the polycarbonate film by etching along tracks formed by energetic charged particles. Each charged-particle track consists of a zone of damaged polycarbonate material in which the energy of one of the particles causes the polycarbonate molecules along the particle's path to cleave (undergo scission). A polycarbonate molecule typically cleaves along certain of its carbonate groups as decarboxylation occurs. Carbon dioxide is released from the molecule during decarboxylation. Apertures are created along the charged-particle tracks by removing the damaged polycarbonate material with etchant that attacks the remnants of the cleaved polycarbonate molecules much more strongly than the uncleaved polycarbonate molecules.

Each polycarbonate molecule in the damaged polycarbonate material need not be cleaved into a large number of small parts for apertures to be created in the polycarbonate film by etching along the charged-particle tracks. Etchants are available which can selectively remove remnants of polycarbonate molecules cleaved at a relatively small number of locations, e.g., less than 10, typically 2–5, without significantly attacking uncleaved polycarbonate molecules. When apertures are to be created through a polycarbonate film by etching along charged-particle tracks, it is thus adequate for the polycarbonate molecules to have the property that each molecule cleaves most readily at only a relatively small number of locations when struck by energetic charged particles.

The homolytic bond cleavage energy in a carbonate repeat unit of a polycarbonate molecule normally reaches a minimum at a location along the repeat unit's carbonate group. There is invariably a difference in minimum homolytic bond cleavage energy among the different carbonate repeat units in a molecule of copolycarbonate. Consequently, copolycarbonate molecules can be configured to have the foregoing advantageous molecular cleavage property.

More particularly, each copolycarbonate molecule contains a primary carbonate component and a further carbonate component. The primary carbonate component is formed with repetitions of a primary carbonate repeat unit. The further carbonate component is formed with repetitions of one or more further carbonate repeat units different from the primary carbonate repeat unit.

Each further carbonate repeat unit has a lower minimum homolytic bond cleavage energy than the primary carbonate repeat unit. Accordingly, each further repeat unit undergoes decarboxylation, and accompanying molecular scission, more readily than the primary repeat unit. The number of carbonate groups along which a copolycarbonate molecule cleaves most readily when struck by an energetic charged particle is thus less than the total number of carbonate groups in the molecule.

The primary carbonate components of the molecules of copolycarbonate in the polycarbonate material of the present liquid chemical formulation normally constitute more than 50%, preferably more than 80%, by mass of the copolycarbonate. Taking note of the fact that bisphenol is a readily available and relatively inexpensive hydrocarbon, the primary repeat unit of each copolycarbonate molecule preferably consists of bisphenol A carbonate. Because each further repeat unit in such an implementation of copolycarbonate cleaves more readily than the bisphenol A carbonate repeat unit, the copolycarbonate cleaves more readily at acceptable locations than polycarbonate material formed solely with bisphenol A carbonate repeat unit. By implementing the copolycarbonate in this way, the polycarbonate material in the present liquid chemical formulation yields a relatively inexpensive polycarbonate film having a fully adequate molecular cleavage property when apertures are to be created through the film by etching along charged-particle tracks.

At least one carbonate repeat unit in the polycarbonate material, especially the copolycarbonate, preferably has free radical stabilization. When molecules of the polycarbonate material undergo scission due, for example, to being struck by energetic charged particles, the free radical stabilization inhibits the remnants of the cleaved polycarbonate molecules from combining with one another or with other material. The ability of the polycarbonate material to maintain the pattern generated by the charged particles or other cleavage-causing phenomenon is thereby enhanced.

Manufacture of a polycarbonate film in accordance with the invention is accomplished by first providing a liquid chemical formulation variously having the properties described above. Water in the liquid formulation can cause undesired scission of the polycarbonate molecules. As a result, the liquid formulation is normally prepared in such a way as to strongly avoid the presence of water. For this purpose, a water scavenger is typically employed. The water scavenger is typically introduced into the liquid prior to dissolving the polycarbonate material in the liquid.

A liquid film of the present liquid chemical formulation is formed over a substructure. Various techniques, such as extrusion coating, can be utilized to create the liquid film. The liquid film is further processed to remove volatile components. The material remaining after such processing is a solid, largely polycarbonate film. Depending on the constituency of the liquid chemical formulation, the polycarbonate film may include, as minor components, one or more other non-volatile constituents of the liquid formulation and/or their reaction products. Importantly, the polycarbonate film is of highly uniform thickness, especially when the average film thickness is in the range of 0.1 $\mu$m to 2 $\mu$m.

As indicated above, apertures are created in the polycarbonate film by subjecting the film to charged particles and then etching along the charged-particle tracks. In a typical application, an electrically non-insulating layer of the substructure is etched through the apertures in the polycarbonate film to form corresponding openings in the non-insulating layer. As used here, "electrically non-insulating" generally means electrically conductive or/and electrically resistive. The openings in the non-insulating layer can then be used to define locations for electron-emissive elements of an electron emitter. For example, the non-insulating layer can be a gate layer that overlies an electrically insulating layer. The insulating layer is etched through the openings in the gate layer to form dielectric open spaces in the insulating layer. Electron-emissive elements are formed in the dielectric open spaces.

When the polycarbonate film serves as a track layer in fabricating a gated electron emitter according to the foregoing process, providing the polycarbonate film with uniform thickness and uniform physical properties enables etching of the charged-particle tracks to be isotropic. As a consequence, the size of the gate openings created by using the aperture-containing polycarbonate track film varies little from opening to opening. The emission of electrons across the electron-emitting area of the electron emitter is quite uniform. A high quality electron-emitting device is thereby formed. In short, the invention provides a substantial technological advance over the prior art.

BRIEF DESCRIPTION OF THE DRAWINGS

FIG. 1 presents data at 20° C. for pure solutions of two polycarbonates of different mean molecular weight dissolved in dry pyridine. FIG. 2 presents data at 20° C. for pure solutions of one polycarbonate dissolved in two different solvents.

FIGS. 9a–9c are cross-sectional views illustrating part of the steps by which an electron-emitting device is created from the structure of FIG. 8b in accordance with the invention.

FIGS. 10a–10c are cross-sectional views illustrating a sequence of steps that utilize the invention's teaching for creating a gated electron-emitting device from the structure of FIG. 9c.

FIGS. 11a–11c are cross-sectional views illustrating another sequence of steps that utilize the invention's teaching for creating a gated electron-emitting device from the structure of FIG. 9c.

Like reference numbers are employed in the drawings and in the description of the preferred embodiments to represent the same, or very similar, item or items.

DESCRIPTION OF THE PREFERRED EMBODIMENTS

General Considerations

Figure 1:
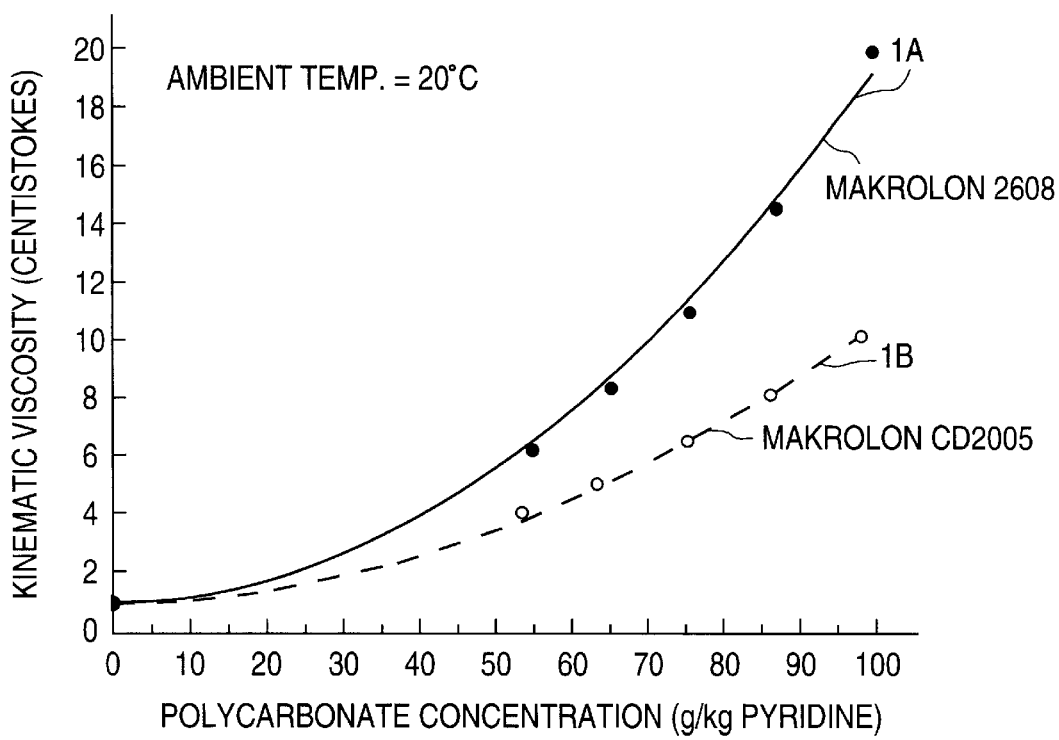
FIGS. 1 and 2 are graphs which illustrate kinematic viscosity of polycarbonate-containing solutions as a function of polycarbonate concentration.

A liquid chemical formulation consisting of polycarbonate material, a liquid which dissolves the polycarbonate material, and one or more other constituents which may be liquid or solid in standard form (i.e., at standard temperature and pressure) is provided in accordance with the invention for making thin solid polycarbonate films of highly uniform thickness. The liquid used for dissolving the polycarbonate in the present liquid chemical formulation is often termed the "polycarbonate solvent" herein.

Polycarbonate material consists of large molecules of polycarbonate. The molecules are typically arranged in long chains. Each polycarbonate molecule contains repetitions of one monomeric carbonate-containing species or repetitions of two or more different monomeric carbonate-containing species. Each such carbonate-containing species, referred to as a carbonate repeat unit, consists of a carbonate ($CO_3$) group and another group, normally a hydrocarbon group. In some representations of a carbonate repeat unit, its carbonate group is split between the two ends of the repeat unit.

The liquid chemical formulation of the invention may contain homopolycarbonate or copolycarbonate. Homopolycarbonate consists of polycarbonate molecules having one type of carbonate repeat unit. As used here, "copolycarbonate" means a carbonate polymer whose molecules each consist of two or more different carbonate repeat units. A copolycarbonate molecule formed with two different carbonate repeat units is referred to here as "bispolycarbonate". A copolycarbonate molecule formed with three different carbonate repeat units is referred to here as "terpolycarbonate".

The carbonate repeat units in the molecules of copolycarbonate can be arranged in various ways. Consider a bispolycarbonate molecule containing carbonate repeat units A and B arranged in a chain. The distribution of repeat units A and B can be essentially random as determined by the reactivities and concentrations of the monomeric materials used to create the bispolycarbonate chain:

—AABABBBABBBBAABBBABBBBAB— (1A)

Repeat units A and B can alternate positions along the chain:

—ABABABABAB— (1B)

Bispolycarbonate can also contain substantial sequences, or blocks, of each of repeat units A and B:

—AAAABBBBBBAAAAAAABBBBB— (1C)

The last type of copolycarbonate is referred to as block copolycarbonate or, for the case of two different carbonate repeat units, block bispolycarbonate. Similar, but more complex, distributions of carbonate repeat units arise when copolycarbonate contains three or more different carbonate repeat units arranged in a chain.

A copolycarbonate molecule can also be arranged as a graft polymer molecule. For a graft bispolycarbonate molecule containing carbonate repeat units A and B, blocks of one of the repeat units are typically grafted as branches onto a backbone of the other repeat unit:

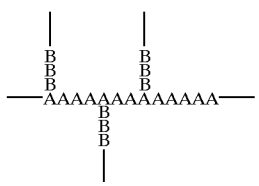
(1D)

Similar, but more complex, distributions of carbonate repeat units arise when a graft copolycarbonate molecule contains three or more different carbonate repeat units.

When formed according to the invention using appropriate polycarbonate solvent, the polycarbonate-containing liquid chemical formulation yields a solid polycarbonate film whose thickness is substantially constant, ranging in value from 0.1 μm to 2 μm. In comparing film thicknesses at any two points separated by up to 10 cm on a planar substructure, the total percentage deviation in thickness from a perfectly uniform film is less than 10%, i.e., less than ±5% from the average thickness.

The polycarbonate films are typically employed in fabricating electron-emitting devices for flat-panel cathode-ray tube ("CRT") devices. Such a flat-panel CRT device can be a flat-panel television or a flat-panel video monitor for a personal computer, a lap-top computer, or a workstation. The polycarbonate films can also be utilized in other applications such as physical filters, optical coatings or devices, and protective coatings.

The composition and density of the polycarbonate films, typically transparent, are normally as uniform as the film thickness. Consequently, the optical properties of transparent polycarbonate films also meet similar uniformity criteria. For optically transparent polycarbonate films, optical quantities defined by the complex refractive index are uniform within similar tolerances.

The manufacture of a thin polycarbonate film according to the invention normally entails forming a liquid film of the present liquid chemical formulation over a substructure and removing the polycarbonate solvent and any other volatile components from the polycarbonate-containing liquid film. The non-volatile components of the original liquid formulation and any non-volatile reaction products of the original liquid formulation components then form the solid polycarbonate film.

In the following description, the term "electrically insulating" (or "dielectric") generally applies to materials having a resistivity greater than $10^{10}$ ohm-cm. The term "electrically non-insulating" thus refers to materials having a resistivity less than or equal to $10^{10}$ ohm-cm. Electrically non-insulating materials are divided into (a) electrically conductive materials for which the resistivity is less than 1 ohm-cm and (b) electrically resistive materials for which the resistivity is in the range of 1 ohm-cm to $10^{10}$ ohm-cm. These categories are determined at an electric field of no more than 10 volts/pm.

Examples of electrically conductive materials (or electrical conductors) are metals, metal-semiconductor compounds (such as metal silicides), and metal-semiconductor eutectics. Electrically conductive materials also include semiconductors doped (n-type or p-type) to a moderate or high level. Electrically resistive materials include intrinsic and lightly doped (n-type or p-type) semiconductors. Further examples of electrically resistive materials are (a) metal-insulator composites, such as cermet (ceramic with embedded metal particles), (b) forms of carbon such as graphite, amorphous carbon, and modified (e.g. doped or laser-modified) diamond, (c) and certain silicon-carbon compounds such as silicon-carbon-nitrogen.

Film Criteria and Constituents

Various process-related factors are important in meeting the thickness and uniformity criteria prescribed above for a polycarbonate film made according to the invention. To achieve the requisite thickness uniformity, the polycarbonate-containing liquid film is formed on the substructure using a method, typically spin coating or extrusion coating, which enables the liquid film to have approximately the same uniformity as that desired for the final solid polycarbonate film. Spin coating can be controlled with sufficient precision for this purpose, being dependent primarily upon the solution viscosity, the angular velocity and angular acceleration of the substructure, and the length of time the substructure is spun. Extrusion coating, which depends primarily on the width of the extrusion slit, the speed of the liquid chemical formulation in passing through the slit, the relative slit-to-substructure speed, the slit-to-substructure distance (gap), and the side-to-side flow uniformity, likewise enables the liquid film to have approximately the same uniformity as the final solid film.

The kinematic viscosity of the polycarbonate-containing liquid chemical formulation of the invention is no more than 100 centistokes at a temperature of 20° C. and a pressure of 1 atmosphere, where 1 centistoke equals $1\times10^{-6}$ m$^2$/sec. and 1 atmosphere equals 101,325 Pa. Normally, the kinematic viscosity of the liquid formulation at 20° C. and 1 atmosphere is in the range of 2 to 25 centistokes for spin coating applications. The rotation speed can be varied usefully from as little as 100 revolutions per minute ("rpm") to as much as 8,000 rpm. For extrusion coating, the kinematic viscosity of the present liquid chemical formulation is normally 20–80 centistokes, preferably 30–45 centistokes, at 20° C. and 1 atmosphere. The slit-to-substructure speed, typically 5 mm/sec., can vary from 2 mm/sec. to 12 mm/sec.

To attain good quality polycarbonate films, the percentage of water in the liquid chemical formulation should be quite low. In particular, the liquid formulation normally has no more than lo water, preferably no more than 0.1% water, by mass of the liquid formulation. The mass percentage of water in the liquid formulation is typically on the order of 0.01% or less. A high concentration of water in the liquid formulation causes precipitation of the polycarbonate material, which can lead to the formation of poor-quality polycarbonate films. A high water concentration also causes generally undesired hydrolysis of the polycarbonate material. Hydrolysis results in a reduction in the mean molecular weight of the polycarbonate material dissolved in the liquid formulation.

The liquid chemical formulation of the invention has the following broad properties:

1a. Aside from the polycarbonate solvent (i.e., the liquid employed to dissolve the polycarbonate material), the principal constituent of the liquid formulation is polycarbonate formed with homopolycarbonate or/and copolycarbonate. The polycarbonate material dissolved in the polycarbonate solvent is present in the solvent at a higher mass fraction than any other constituent present in the solvent. More particularly, the polycarbonate material normally constitutes at least 90%, typically at least 99%, of all the solid material dissolved or otherwise present in the solvent.

1b. The polycarbonate material normally has a mean molecular weight of at least 2,000 in the liquid formulation. The mean molecular weight of the polycarbonate material in the liquid formulation, referred to here as the mean "wet" molecular weight of the polycarbonate material, is typically 4,000–10,000. The mean wet molecular weight of the polycarbonate material may, of course, be greater than 10,000. It is acceptable and, in some cases, may be desirable for the mean wet molecular weight of the polycarbonate material to be 50,000 or more.

When hydrolysis occurs, the polycarbonate material normally has considerably higher mean molecular weight prior to being dissolved in the polycarbonate solvent than after being dissolved in the solvent. The mean molecular weight of the polycarbonate material prior to being dissolved in the polycarbonate solvent is referred to here as the mean "dry" molecular weight of the polycarbonate material. The mean dry molecular weight of the polycarbonate material is at least 10,000, usually at least 20,000, and normally no more than 100,000. Preferably, the polycarbonate's mean dry molecular weight is 40,000–50,000.

The higher the mean molecular weight of the polycarbonate material, the higher the kinematic viscosity of the liquid formulation for a given polycarbonate concentration. This relationship is illustrated in FIG. 1 in which the kinematic viscosity for experimental polycarbonate-containing solutions is plotted as a function of the mass concentration of polycarbonate material in the solution for polycarbonates of two different mean dry molecular weights.

In particular, FIG. 1 presents data obtained at 20° C. for pure solutions of: (1A) MAKROLON® 2608 polycarbonate (specifically MAKROLON 2608-1000N polycarbonate) having a mean dry molecular weight of approximately 47,000 and (1B) MAKROLON CD2005 polycarbonate having a mean dry molecular weight of approximately 18,000. MAKROLON 2608 and MAKROLON CD2005 polycarbonates are homopolycarbonates made by Bayer. Both polycarbonates were dissolved in dry pyridine, i.e., pyridine processed to reduce the water content to a very low level, typically no more than 0.01% by mass. FIG. 1 also illustrates, as expected, that the kinematic viscosity increases non-linearly with increasing polycarbonate concentration in pyridine.

Figure 2:
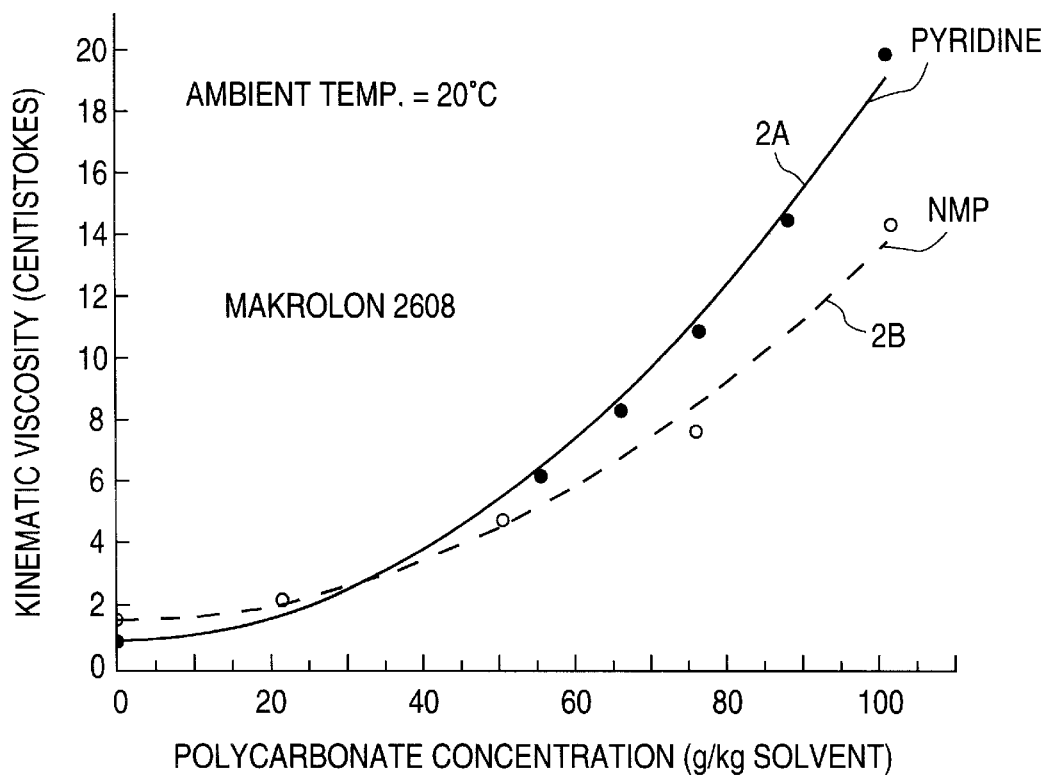

Similar variations of kinematic viscosity with polycarbonate concentration occur with other polycarbonate solvents. This is illustrated in FIG. 2 by way of kinematic viscosity/polycarbonate mass concentration data obtained at 20° C. for pure solutions of MAKROLON 2608 polycarbonate dissolved in: (2A) pyridine and (2B) 1-methylpyrrolidinone commonly known as NMP. As with the solutions represented by the data in FIG. 1, the solvents used in generating the data in FIG. 2 were processed to reduce the water content to a very low level.

1c. The polycarbonate material is substantially water-free (anhydrous) immediately prior to being dissolved in the polycarbonate solvent during the preparation of the liquid chemical formulation. In particular, the polycarbonate material contains no more than 0.1%, preferably less than 0.01%, water by mass prior to being dissolved in the solvent. If the polycarbonate material initially contains a higher mass percentage of water, the polycarbonate material is suitably dried to reduce the water content below this value.

1d. The liquid chemical formulation may include a surfactant, i.e., a soap-like material which exhibits a positive surface-excess concentration in the liquid formulation of the invention. The surfactant decreases the contact angle between the liquid formulation and the substructure, thereby improving the wetting of the substructure by the liquid formulation. The surfactant may be in liquid or solid form prior to being introduced into the polycarbonate solvent. If the surfactant is non-volatile, it will remain as a minor component of the solid polycarbonate film after the liquid film is processed to remove volatile components. The surfactant may or may not exhibit a positive surface-excess concentration in the solid polycarbonate film.

1e. The liquid chemical formulation may include an adhesive or adhesion promoter, i.e., a material which increases the energy per unit area necessary to separate the polycarbonate film from the substructure. As with the surfactant, the adhesive or adhesion promoter may be in liquid or solid form prior to being introduced into the polycarbonate solvent. If the adhesive or adhesion promoter is non-volatile, it likewise remains as a minor component of the solid polycarbonate film after the liquid film is processed to remove volatile components. The adhesive or adhesion promoter may also react with the substructure and/or the polycarbonate film at the substructure/film interface, leaving non-volatile products which form part of the polycarbonate film.

1f. The liquid chemical formulation may include a dye that dissolves in the polycarbonate solvent. The soluble dye may likewise remain as part of the solid polycarbonate film after processing the liquid film to remove volatile components.

The polycarbonate material in the liquid chemical formulation of the invention typically consists of homopolycarbonate whose molecules each contain repetitions of only one carbonate repeat unit. Each homopolycarbonate molecule has a homopolycarbonate core whose chemical structure can be chemically represented by the polymer formula:

(2)

where the material within the parentheses is the monomeric carbonate repeat unit, the $CO_3$ portion is a carbonate group, R represents a bivalent hydrocarbon group, each connecting line represents a single covalent chemical bond, and plural integer n is the number of repetitions of the carbonate repeat unit in the molecule. Suitable polycarbonate terminating groups (not shown) are present at both ends of the polymer chain.

Repetition integer n is normally at least 10, typically at least 40, prior to dissolving the polycarbonate material in the polycarbonate solvent. The mean molecular weight of the polycarbonate material increases linearly with increasing n.

The oxygen atom located at the left-hand end of the carbonate group in formula 2 is sometimes placed to the immediate right of bivalent group R. The so-moved oxygen atom thereby becomes the right-hand end of the carbonate repeat unit, while the carbon atom becomes the left-hand end of the repeat unit. In this modified representation of the core of a homopolycarbonate molecule, the carbonate group in the repeat unit is thus split between the two ends of the repeat unit.

A preferred form of the homopolycarbonate is poly (bisphenol A carbonate) alternatively referred to here as bisphenol A homopolycarbonate. The polymeric core of a bisphenol A homopolycarbonate molecule can be represented as:

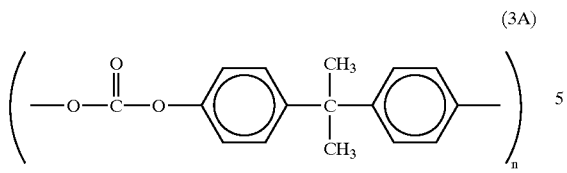

(3A)

where each hexagonal ring with an inner circle represents an unsubstituted phenylene group.

The intersection of two or more straight lines in a polygonal ring symbol of a chemical formula, such as either hexagonal ring in formula 3A, has the conventional meaning of representing a carbon atom. As is likewise conventional, a circle within a polygonal ring indicates multiple double covalent bonds: three for a hexagonal ring, and two for a pentagonal ring. Hydrogen atoms sufficient in number to complete carbon's valence-four bonding are present at the corners of a ring symbol.

The homopolycarbonate in formula 3A is typically a MAKROLON homopolycarbonate made by Bayer. Preferably, the MAKROLON homopolycarbonate is MAKROLON 2608, whose mean dry molecular weight is approximately 47,000. For MAKROLON 2608, the number n of repeat units is approximately 190 prior to dissolving the homopolycarbonate in the polycarbonate solvent.

Other homopolycarbonates suitable for the polycarbonate material in the present liquid chemical formulation include allylic cyclohexene, benzylic, and tertiary homopolycarbonates. Two examples of the polymeric core of an allylic cyclohexene homopolycarbonate molecule are given by the formulas:

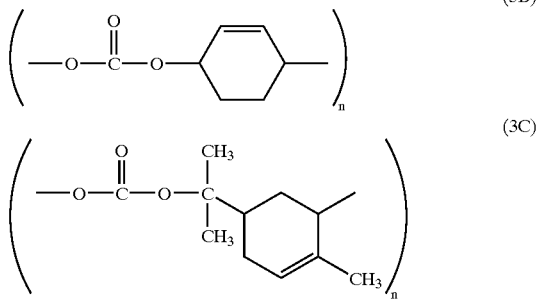

(3B)

(3C)

where each hexagonal ring with a short interior line represents a cyclohexene group. Two examples of the polymeric core of a benzylic homopolycarbonate molecule are given by the formulas:

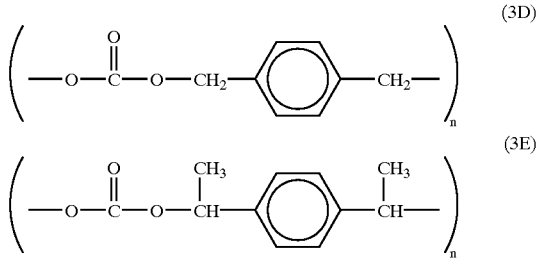

(3D)

(3E)

An example of the polymeric core of a tertiary homopolycarbonate molecule is given by the formula:

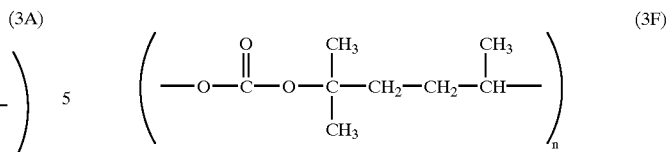

(3F)

In the emitter-fabrication process described below, energetic charged-particles form tracks through a polycarbonate film. The tracks constitute damaged polycarbonate zones in which polycarbonate molecules are cleaved (broken into multiple parts). The polycarbonate film is then subjected to etchant that attacks the damaged polycarbonate material, i.e., the cleaved polycarbonate molecules and the solid reaction products, much greater than the undamaged polycarbonate material so as to form apertures through the polycarbonate film along the track locations. Implementing the polycarbonate file with polycarbonate molecules that cleave readily when subjected to energetic charged particles facilitates making apertures in the film.

The minimum homolytic bond cleavage energy for a homopolycarbonate molecule normally occurs at locations along its carbonate groups. Consequently, the molecule normally cleaves most readily along the carbonate groups and thereby undergoes decarboxylation so as to release carbon dioxide. Allylic cyclohexene, benzylic, and tertiary homopolycarbonates each have a lower minimum homolytic bond cleavage energy than bisphenol A homopolycarbonate. Less energy is needed for charged particles to cleave allylic cyclohexene, benzylic, and tertiary homopolycarbonates than is needed to cleave bisphenol A homopolycarbonate. Accordingly, allylic cyclohexene, benzylic, and tertiary homopolycarbonates are especially suitable for use as the polycarbonate track film in the present emitter-fabrication process.

The repeat unit of an allylic cyclohexene or benzylic copolycarbonate molecule has a double carbon-carbon bond so located with respect to the repeat unit's carbonate group as to achieve a resonance structure that enables the allylic cyclohexene or benzylic repeat unit to have free radical stabilization along the repeat unit's carbonate group. Free radical stabilization is described in Skinner, "A study of the Thermal Stability of Cardo-Polymers and Their Electronic Susceptibility to the Capto Dative Effect," Ph-D. dissertation, Polytechnic Univ., January 1994, pages 21–27. Also see Streitwieser et al, Introduction to Organic Chemistry (3d ed., Macmillan Publishing Co.), 1985, pages 10–12. The repeat unit of a tertiary homopolycarbonate molecule also has free radical stabilization along the tertiary repeat unit's carbonate group, although typically to a somewhat lesser extent than that of the repeat unit of an allylic cyclohexene or benzylic homopolycarbonate molecule.

When a homopolycarbonate molecule having free radical stabilization along the carbonate groups of the molecule's repeat units cleaves along one or more of the carbonate groups upon being subjected to a cleavage-causing phenomenon such as energetic charged particles, the free radical stabilization electronically stabilizes the cleaved remnants (free radicals) of the molecule. The molecule's remnants are thereby significantly inhibited from recombining or from combining with other material, especially compared to a molecule of homopolycarbonate material, such as bisphenol A homopolycarbonate, not having significant free radical stabilization. The pattern which energetic charged particles or other molecular cleavage-causing phenomenon create in homopolycarbonate having free radical stabilization is stabilized. The free radical stabilization provided by allylic cyclohexene, benzylic, and tertiary homopolycarbonates makes them even more attractive for use as the track film in the emitter-fabrication process of the invention.

The polycarbonate material may, as indicated above, include copolycarbonate whose molecules each contain repetitions of multiple different monomeric carbonate repeat units. In such a case, the copolycarbonate normally constitutes at least 5%, preferably at least 10%, by mass of the polycarbonate material. The copolycarbonate is typically the dominant constituent of the polycarbonate material. That is, the copolycarbonate typically constitutes more than 50% of the polycarbonate material by mass. More preferably, the copolycarbonate constitutes at least 90%, typically nearly all, of the polycarbonate material by mass.

A copolycarbonate molecule has a copolycarbonate core whose molecular structure can be generally chemically represented by the polymer formula:

$$(-A_1-\ldots-A_p-)_n \qquad (4)$$

where p is a plural integer, each $A_i$ is a different bivalent carbonate repeat unit for integer i varying from 1 to p, and n is a multiplicity indicator which indicates that each carbonate repeat unit $A_i$ occurs multiple times in the copolycarbonate core. Each carbonate repeat unit $A_i$ in formula 4 may be present the same number, or a different number, of times as any other carbonate repeat unit $A_i$ in the copolycarbonate molecule. In contrast to homopolycarbonate formula 2 where integer n represents the number of repetitions of the single carbonate repeat unit, integer n in copolycarbonate formula 4 does not mean that each repeat unit $A_i$ occurs n times, and thus the same number of times, in a copolycarbonate molecule as each other repeat unit $A_i$. All that integer n means in formula 4 is that each repeat unit $A_i$ is present two or more times in a copolycarbonate molecule. Although repeat units $A_1-A_p$ in formula 4 are presented in a chain starting from repeat unit $A_1$ at one end to repeat unit $A_p$ at the other end, each repeat unit $A_i$ may be covalently bonded to any other repeat unit $A_i$ dependent on the reactivities and concentrations of the monomeric materials from which the copolycarbonate is made.

With the foregoing in mind, the copolycarbonate molecular core represented by formula 4 is typically arranged as a chain with suitable terminating groups (not shown) at both ends of the chain. Carbonate repeat units $A_1-A_p$ in a particular implementation of formula 4 can be distributed in various ways relative to one another. For example, repeat units $A_1-A_p$ can be positioned essentially random relatively to one another or can be arranged in blocks, each containing a substantial number of each repeat unit $A_i$. For the bispolycarbonate case in which integer p is 2, repeat units $A_1$ and $A_2$ can alternate with each other. A similar repeating arrangement can occur when integer p is 3 or more. The copolycarbonate core represented by formula 4 can also be the core of a graft copolycarbonate.

Carbonate repeat units $A_1-A_p$ normally have different minimum homolytic bond cleavage energies. Assume that the minimum homolytic bond cleavage energy decreases progressively in going from repeat unit $A_1$ to repeat unit $A_p$. Let repeat unit $A_1$ be referred to as the primary carbonate repeat unit. Let each other repeat unit $A_i$, i.e., $A_{i\neq 1}$, be referred to as a further carbonate repeat unit. Accordingly, each further repeat unit $A_{i\neq 1}$ is of lower minimum homolytic bond cleavage bond energy than primary repeat unit $A_1$ and undergoes decarboxylation more readily than primary repeat unit $A_1$. Hence, a copolycarbonate molecule cleaves more readily along the carbonate groups of each further repeat unit $A_{i\neq 1}$ than along the carbonate groups of primary repeat unit $A_1$.

The invention takes advantage of this difference in repeat unit cleavage propensity to produce copolycarbonate especially suitable for use in a polycarbonate tracking film in the emitter-fabrication process described below. More particularly, when energetic charged particles pass into a polycarbonate track film to create tracks consisting of damaged polycarbonate material formed with cleaved polycarbonate molecules, it is typically unnecessary for the polycarbonate molecules to be capable of readily cleaving at every carbonate group. It is typically adequate for the polycarbonate molecules to be capable of cleaving most readily at a moderately small number, e.g., less than 10, typically 2–5, of the total number of carbonate groups in the molecule.

A reduction in the number of carbonate groups that most readily undergo decarboxylation so as to cleave a polycarbonate molecule upon being struck by energetic charged particles occurs when, in accordance with the invention, the polycarbonate film is formed with copolycarbonate in which carbonate repeat units $A_1-A_p$ have different minimum homolytic bond cleavage energies and thus different propensities to cause molecular scission while at least further repeat unit $A_p$ has a minimum homolytic bond cleavage energy sufficiently low that repeat unit $A_p$ readily undergoes decarboxylation. The different in cleavage propensities is enhanced by increasing the difference between the minimum homolytic bond cleavage energy of primary repeat unit $A_1$ and the minimum homolytic bond cleavage energy of at least further repeat unit $A_p$.

The number of carbonate groups that most readily undergo decarboxylation in a copolycarbonate molecule typically decreases as the presence of primary repeat unit $A_1$ is increased relative to the presence of at least further repeat unit $A_p$. For this purpose, the repetitions of primary repeat unit $A_1$ in a copolycarbonate molecule form a primary carbonate component of the molecule. The repetitions of every further repeat unit $A_{i\neq 1}$ in the molecule constitute a further carbonate component of the molecule. The primary and further carbonate components, together with the terminating groups, form the entire molecule.

Copolycarbonate molecules formed with the same carbonate repeat units $A_1-A_p$ may differ as to the number of times each repeat unit $A_i$ occurs in any particular molecule. Accordingly, copolycarbonate molecules formed with the same carbonate repeat units may differ in molecular weight. With this in mind, a parameter useful in regulating the number of carbonate groups that most readily undergo decarboxylation in copolycarbonate is the percentage of total copolycarbonate mass formed by the primary carbonate components of the copolycarbonate molecules. The primary carbonate components of the molecules together constitute a substantial percentage, normally at least 50%, by mass of the copolycarbonate. More particularly, the primary carbonate components together preferably constitute at least 80%, more preferably at least 90%, by mass of the copolycarbonate. When the copolycarbonate constitutes virtually all the polycarbonate material, the primary carbonate components thus normally form at least 50%, preferably at least 80%, more preferably at least 90%L by mass of the polycarbonate material.

In a typical situation, primary carbonate repeat unit $A_1$ can be prepared from readily available, relatively inexpensive monomeric material, while the monomeric material used to prepare each further repeat unit $A_{i\neq 1}$ is more expensive, per unit mass, than the monomeric material used to prepare primary repeat unit $A_1$. Also, in the typical situation, the cost of preparing copolycarbonate having repeat units $A_1-A_p$ is not significantly different from the cost of preparing a homopolycarbonate having primary repeat unit $A_1$. Since the bulk, normally the great bulk, of the copolycarbonate consists of primary repeat unit $A_1$, the copolycarbonate has better cleavage properties than a homopolycarbonate formed with primary repeat unit $A_1$ but is unlikely to cost significantly more, per unit mass, than the homopolycarbonate formed with primary repeat unit $A_1$.

An attractive candidate for primary carbonate repeat unit $A_1$ is bisphenol A carbonate repeat unit. Bisphenol is readily available and, compared to most other monomers suitable for preparing polycarbonate material, is relatively inexpensive. Bisphenol A carbonate repeat unit is combined with another, typically more expensive, carbonate repeat unit of lower homolytic bond cleavage energy than bisphenol A carbonate repeat unit to form a bispolycarbonate which, although normally slightly more expensive than bisphenol A homopolycarbonate, is still relatively inexpensive, especially when the bisphenol A carbonate components constitute at least 80%, typically at least 90%, by mass of the bispolycarbonate. Importantly, a bispolycarbonate formed with bisphenol A carbonate repeat unit and another carbonate repeat unit in this manner cleaves more readily than bisphenol A homopolycarbonate.

With integer p being 2 in the case of bispolycarbonate, candidates for further repeat unit $A_2$ are allylic cyclohexene, benzylic, and tertiary carbonate repeat units when primary repeat unit $A_1$ is bisphenol A carbonate repeat unit. Each of the allylic cyclohexene, benzylic, and tertiary repeat units is of lower minimum homolytic bond cleavage energy than bisphenol A carbonate repeat unit. The resulting bispolycarbonate candidates for the polycarbonate material in the present liquid chemical formulation respectively are bisphenol A/allylic cyclohexene, bisphenol A/benzylic, and bisphenol A/tertiary bispolycarbonates.

Two examples of the polymeric core of a bisphenol A/allylic cyclohexene bispolycarbonate molecule are given by the formulas:

For bisphenol A/allylic cyclohexene, bisphenol A/benzylic, and bisphenol A/tertiary bispolycarbonates, the allylic cyclohexene, benzylic, and tertiary repeat units have free radical stabilization along their carbonate groups. Similar to what was said above about a homopolycarbonate molecule having free radical stabilization, the remnants (free radicals) of a bispolycarbonate molecule or other copolycarbonate molecule cleaved along the carbonate group of a repeat unit having free radical stabilization along that repeat unit are inhibited from recombining or combining with other material.

Inasmuch as bisphenol A/allylic cyclohexene, bisphenol A/benzylic, and bisphenol A/tertiary bispolycarbonates cleave most readily along the carbonate groups of their respective allylic cyclohexene, benzylic, and tertiary repeat units, the free radical stabilization in these bispolycarbonates occurs precisely where molecules of these bispolycarbonates cleave most readily. The free radical stabilization thus occurs at the locations where it is needed for preserving a pattern created in these bispolycarbonates by energetic charged-particles or other molecular cleavage-causing phenomenon. Accordingly, bisphenol A/allylic cyclohexene, bisphenol A/benzylic, and bisphenol A/tertiary bispolycarbonates are very attractive for use as the polycarbonate track layer in the present invention.

Other bispolycarbonate candidates for the polycarbonate material in the present liquid chemical formulation include benzylic/allylic cyclohexene, benzylic/benzylic, and tertiary/benzylic bispolycarbonates. For these bispolycarbonates, both primary repeat unit $A_1$ and further repeat unit $A_2$ have free radical stabilization along their carbonate groups.

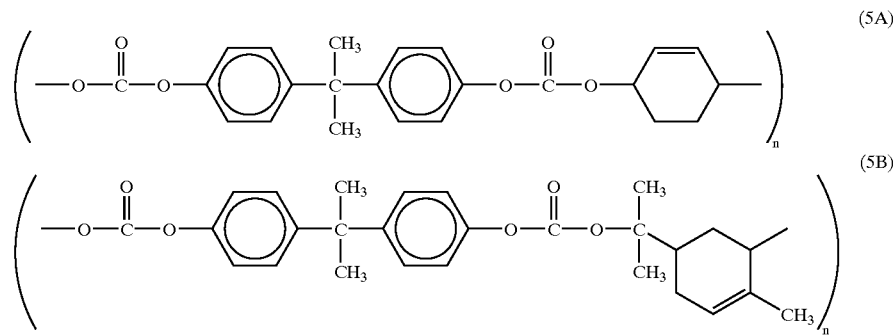

(5A)

(5B)

Examples of the polymeric cores of bisphenol A/benzylic and bisphenol A/tertiary bispolycarbonate molecules are given respectively by the formulas:

Two examples of the polymeric core of a benzylic/allylic cyclohexene bispolycarbonate molecule are given by the formulas:

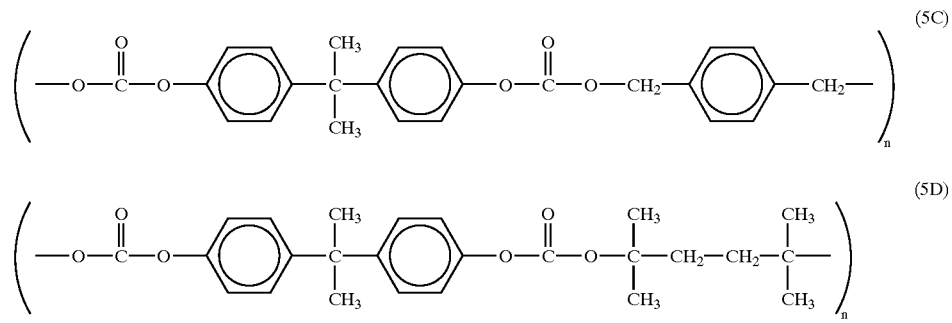

(5C)

(5D)

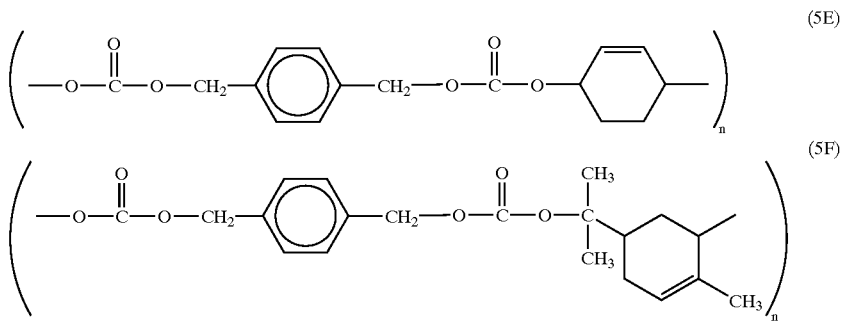

Two examples of the polymeric core of a benzylic/benzylic bispolycarbonate molecule are given the formulas:

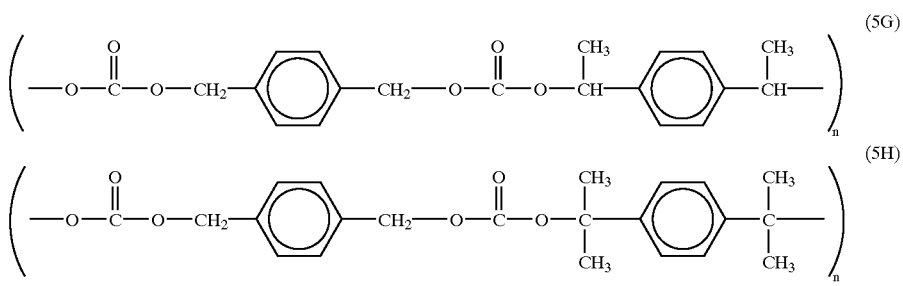

An example of the polymeric core of a tertiary/benzylic bispolycarbonate molecule is given by the formula:

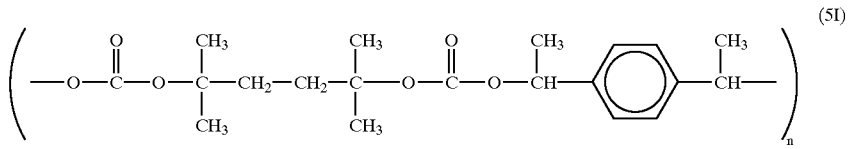

In the bispolycarbonates of formulas 5E–5H, the benzylic carbonate repeat unit at the left in each formula is primary repeat unit $A_1$ while the allylic cyclohexene (formulas 5E and 5F) or benzylic (formulas 5G and 5H) carbonate repeat unit at the right in each formula is further repeat unit $A_2$ of lower minimum homolytic bond cleavage energy than the left-hand primary benzylic carbonate repeat unit. The right-hand carbonate repeat unit in the bispolycarbonate of formula 5I is primary repeat unit $A_1$, while the left-hand repeat unit is further repeat unit $A_2$.

A surfactant may be present in the present liquid chemical formulation for the reasons outlined previously. The preferred surfactant is Fluorad™ FC-430 surfactant, a viscous liquid mixture of fluoroaliphatic polymeric esters made by Minnesota Manufacturing and Mining Co. and present at a concentration sufficient to act as a wetting agent. The concentration of Fluorad FC-430 surfactant in the liquid chemical formulation is 0.001–1 g surfactant/kg polycarbonate solvent, typically 0.22 g surfactant/kg polycarbonate solvent.

Polycarbonate Solvent Criteria and Constituents

The polycarbonate solvent is capable of dissolving sufficient polycarbonate material to achieve a final polycarbonate film thickness between 0.1 $\mu$m and 2 $\mu$m, and a final thickness uniformity better than 10% (±5%), preferably better than 4% (±2%), for thicknesses measured at points on a planar substructure separated by up to 10 cm. For this purpose, the solubility of polycarbonate material in the solvent is normally at least 1%, but may be as low as 0.5%, by mass of the liquid chemical formulation at 20° C. and 1 atmosphere. The solvent is preferably capable of dissolving at least 5% polycarbonate by mass at 20° C. and 1 atmosphere.

The liquid chemical formulation solution normally contains no more than 50% polycarbonate material by mass of the liquid formulation when spin coating is used to make polycarbonate films. Liquid formulations with higher polycarbonate concentration, e.g., greater than 50% by mass, can exhibit viscous fingering and slow surface wetting during spin coating, thereby yielding polycarbonate films of poorer uniformity in their physical properties. The percentage of polycarbonate material in liquid formulations used for spin coating is typically no more than 20% by mass. The polycarbonate concentration ranges of 1% to 10%, preferably 5% to 10%, by mass are especially useful for spin coating polycarbonate films to achieve a final thickness between 0.1 $\mu$m and 2 $\mu$m.

The percentage of polycarbonate material in the liquid chemical formulation used for creating a polycarbonate film by extrusion coating, extrusion-spin coating, or meniscus coating is likewise normally no more than 50% by mass of the liquid formulation. In the case of extrusion coating, the concentration of the polycarbonate material in the liquid formulation is typically no more than 20% by mass of the formulation. For a polycarbonate film deposited by extrusion coating so as to achieve a film thickness of 0.1–2 μm, the polycarbonate concentration ranges of 1–15%, preferably 8–12%, by mass are particularly useful.

In addition to the solubility requirements outlined above, the polycarbonate solvent has the following properties:

2a. The melting point $T_m(1\ atm)$ of the solvent at 1 atmosphere is normally less than 20° C. Typically, the ambient temperature $T_{amb}$ at which the liquid chemical formulation is coated onto the substructure in the process of making the polycarbonate film is approximately 20° C. Consequently, the condition that $T_m(1\ atm)$ be less than $T_{amb}$ ensures that the liquid chemical formulation of the invention is indeed a liquid at the conditions specified.

2b. The boiling point $T_b(1\ atm)$ of the polycarbonate solvent at 1 atmosphere is normally at least 80° C. As a result, $T_b(1\ atm)$ of the solvent is normally greater than or equal to $(T_{amb}+60°\ C.)$. This ensures that the rate of evaporation of the polycarbonate solvent from the liquid chemical formulation is sufficiently low at the ambient temperature $T_{amb}$ to permit the formation of a uniform liquid film of the formulation over the substructure in the process of making the polycarbonate film.

2c. The polycarbonate solvent does not polymerize or chemically react with the polycarbonate material at a significant rate.

2d. The polycarbonate solvent is substantially water-free. Preferably, the solvent contains no more than 0.1% water by mass. If the solvent initially contains a higher percentage of water, the solvent is suitably dried to reduce the percentage of water to an appropriately low level.

Alternatively or additionally, a water scavenger is added to the polycarbonate solvent to remove water from the solvent and the polycarbonate material. The water scavenger reacts with water in the solvent to produce volatile species. The water scavenger is typically introduced into the solvent before the polycarbonate material is introduced into the solvent. Consequently, the solvent is typically substantially water-free when the polycarbonate material is dissolved in the solvent.

The polycarbonate solvent is typically provided with a slight excess of the amount of water scavenger needed to make the solvent substantially water-free. When the polycarbonate material is dissolved in the solvent, the excess water scavenger reacts with water in the polycarbonate material to produce further volatile species. By removing water from the solvent in the polycarbonate material, the water scavenger inhibits reduction in the mean molecular weight of the polycarbonate material.

The water scavenger is typically acetic anhydride $((C_2H_6O)_2O)$ when the polycarbonate solvent is 1-methylpyrrolidinone. Acetic anhydride normally constitutes 0.1–1, typically 0.2%, by mass of the polycarbonate solvent. Acetic anhydride reacts with water to produce acetic acid that readily evaporates from the solvent. An advantage of using acetic anhydride as the water scavenger is that acetic acid is of low toxicity.

2e. The polycarbonate solvent does not significantly promote or catalyze chemical reactions between the polycarbonate material and other constituents of the liquid chemical formulation, such as water.

2f. The polycarbonate solvent does not react with water in the liquid chemical formulation to form significant concentrations of hydroxide ion ($OH^-$). In other words, the solvent is a relatively weak Bronsted base compared to hydroxide ion. When present in the liquid formulation of the invention, hydroxide ion reacts with the polycarbonate material, resulting in scission of the polycarbonate molecules and a decrease in the mean molecular weight of the polycarbonate material.

Reaction of a solvent with water to form hydroxide ion is a conventional Bronsted acid-base reaction:

$$B+H_2O \Leftrightarrow BH^+ + OH^- \tag{6}$$

where B represents the solvent acting as a Bronsted base. If the solvent is a relatively weak Bronsted base compared to hydroxide ion, the solvent is also a weak Bronsted base in aqueous solution. Equivalently stated, the protonated form of the solvent molecule $BH^+$ is a weak Bronsted acid in aqueous solution.

The preferred upper limit for the concentration of hydroxide ion in the polycarbonate-containing liquid chemical formulation of the invention is approximately $10^{-3}$ mol/$dM^3$, i.e., 1 mM. Given the limits described previously for water concentration in the liquid formulation, it follows that the protonated form of the solvent should have an acid dissociation constant $K_a(BH^+)$ in aqueous solution greater than $10^{-8}$ at 20° C. $K_a(BH^+)$ is the thermodynamic equilibrium constant for the reaction:

$$BH^+ + H_2O \Leftrightarrow H_3O^+ + B \tag{7}$$

The higher the concentration of hydroxide ion in the chemical liquid formulation of the invention, the shorter the effective shelf life of the liquid formulation.

2g. The polycarbonate solvent does not substantially chemically or physically alter the substructure onto which the liquid chemical formulation is coated.

2h. The polycarbonate solvent is non-pyrophoric, i.e., it does not ignite spontaneously upon exposure to air. The solvent should not oxidize to a significant extent when exposed to air.

2i. The polycarbonate solvent may itself include a surfactant component to improve the wetting characteristics of the liquid chemical formulation on the substructure. The surfactant component of the solvent should conform to reactivity and composition conditions 2c to 2h given above.

A primary candidate for the polycarbonate solvent is pyridine, a liquid which meets the polycarbonate solubility requirements given above. Pyridine can dissolve considerably more than 10% polycarbonate by mass at 20° C. and 1 atmosphere. For example, the solubility of a MAKROLON polycarbonate such as MAKROLON 2608 can exceed 40% by mass in pyridine at 20° C. and 1 atmosphere.

The melting point $T_m(1\ atm)$ of pyridine at 1 atmosphere is approximately −42° C. This is less than 20° C., thereby enabling pyridine to meet condition 2a above. The boiling point $T_b(1\ atm)$ of pyridine at 1 atmosphere is approximately 115° C., which is greater than 80° C., as specified in condition 2b above.

Pyridine is a nucleophile and thus can react with electrophilic moieties in polycarbonate to catalyze polycarbonate hydrolysis. However, the rates of these reactions are insignificant, and the extent of reaction is insignificant over time scales of months at the typical ambient temperature of 20° C., provided the water content of the liquid chemical formulation is sufficiently low. Storing the liquid formulation at temperatures lower than 20° C. increases the shelf life of the formulation.

Pyridine can be dried by standard methods to water concentrations less than 0.001% by mass. Although hygroscopic, pyridine is typically treated and handled here in such a manner that the percentage of water in the liquid chemical formulation is less than 0.01% by mass. The acid dissociation constant $K_a$ of protonated pyridine (the pyridinium ion) in aqueous solution at 20° C. is approximately $6 \times 10^{-6}$. Hence, pyridinium satisfies condition 2f that the acid dissociation constant of the protonated form of the polycarbonate solvent in aqueous solution be greater than $10^{-8}$ at 20° C.

Pyridine is not pyrophoric. It can be oxidized to form pyridine N-oxide. However, this reaction requires strong oxidizing agents, and the rates of air oxidation are insignificant at the typical ambient temperature of 20° C. Pyridine is surface-active on many metals, semiconductors and insulators, typically acting as a corrosion inhibitor. Consequently, pyridine does not significantly alter the physical or chemical composition of many practical substructure materials.

The polycarbonate solvent may alternatively or additionally (i.e., in addition to what has previously been identified here for dissolving polycarbonate material according to the invention's teachings) be formed with one or more ring-substituted pyridine derivatives (hereafter, for simplicity, generally referred to in the singular as a ring-substituted pyridine derivative). When a ring-substituted pyridine derivative is employed, the solvent likewise meets all the polycarbonate solvent criteria given above. Either pyridine or the ring-substituted pyridine derivative may be the primary constituent of the solvent when both constituents are present in the solvent.

Both pyridine and the ring-substituted pyridine derivative can be chemically represented as:

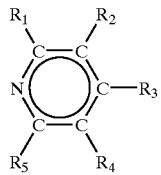

(8)

where each of $R_1$, $R_2$, $R_3$, $R_4$ and $R_5$ represents a monovalent substituent bonded covalently to the aromatic ring. Each of $R_1$ to $R_5$ is typically a hydrogen atom, a deuterium atom, a monovalent hydrocarbon group, a monovalent substituted hydrocarbon group, an acetyl group, a carboxaldehyde group, a halogen atom, or a monovalent pseudo-halogen substituent. A substituted hydrocarbon group is a hydrocarbon group in which at least one of the hydrogen (or deuterium) atoms is replaced with another chemical species. For the monovalent hydrocarbon group, the number of carbon atoms for each of $R_1$ through $R_5$ normally ranges from one to four. The same range applies to the substituted monovalent hydrocarbon group.

Formula 8 yields pyridine when each of $R_1$ through $R_5$ is hydrogen or deuterium. The empirical formula for pyridine is $C_5H_5N$ in the fully hydrogen-substituted molecule. A ring-substituted pyridine derivative is produced when at least one of $R_1$ through $R_5$ in formula 8 is a substituent other than hydrogen or deuterium, preferably one from the above list.

Several types of ring-substituted pyridine derivatives are of special interest for use as the solvent. One type is the case in which one of $R_1$ to $R_5$ is an alkyl group, preferably having from one carbon atom (the picolines) to four carbon atoms. The remainder of $R_1$ through $R_5$ may consist of any of the monovalent covalent substituents given above, including hydrogen and deuterium.

A second type of pyridine derivative of special interest consists of those derivatives in which two adjacent substituent positions are taken up by a fused ring, i.e., a ring substituent which shares a carbon-carbon-bonded (non-nitrogen) edge with the pyridine ring. Two benz-fused examples of this type of pyridine derivatives are given below:

(9)

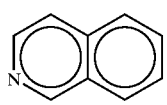

(10)

In an aromatic fused-ring substituent, represented (for example) by the right hand ring in formula 9 or 10, each ring carbon outside the fused edge is covalently bonded to a monovalent substituent. In a non-aromatic fused-ring substituent, each ring carbon outside the fused edge is covalently bonded to a pair of monovalent substituents or to a bivalent substituent. Consequently, the ring substituent in a fused-ring substituent derivative of pyridine may itself be substituted. The remainder of the substituent positions may be taken up by one or more of the substituent groups listed above for $R_1$ through $R_5$ in formula 8. Examples of appropriate benz-fused derivatives of special interest are the substituted quinolines, formula 9, and the substituted isoquinolines, formula 10.

When at least one of $R_1$ through $R_5$ in formula 8 is a halogen atom, the halogen can be fluorine, chlorine, bromine or iodine, with fluorine or chlorine being preferred substituents. In the case of monovalent pseudo-halogen substituents, the substituent is typically a nitrile group.

Specifically, pyridine derivatives of interest for use as the polycarbonate solvent in the present liquid chemical formation include the liquids given in the following table:

TABLE 1

| Chemical Name | Empirical Formula | $T_b$ (1 atm) (° C.) |
| --- | --- | --- |
| 2-methylpyridine | $C_6H_7N$ | 128 |
| 3-methylpyridine | $C_6H_7N$ | 144 |
| 4-methylpyridine | $C_6H_7N$ | 145 |
| 2-ethylpyridine | $C_7H_9N$ | 149 |
| 3-ethylpyridine | $C_7H_9N$ | 165 |
| 4-ethylpyridine | $C_7H_9N$ | 168 |
| 2,3-dimethylpyridine | $C_7H_9N$ | 163 |
| 2,4-dimethylpyridine | $C_7H_9N$ | 159 |
| 2,5-dimethylpyridine | $C_7H_9N$ | 157 |
| 2,6-dimethylpyridine | $C_7H_9N$ | 146 |
| 3,4-dimethylpyridine | $C_7H_9N$ | 163–164 |
| 3,5-dimethylpyridine | $C_7H_9N$ | 172 |
| 2-ethyl-4-methylpyridine | $C_8H_{11}N$ | 173 |
| 2-ethyl-6-methylpyridine | $C_8H_{11}N$ | 160 |
| 3-ethyl-4-methylpyridine | $C_8H_{11}N$ | 198 |
| 4-ethyl-2-methylpyridine | $C_8H_{11}N$ | 179 |
| 5-ethyl-2-methylpyridine | $C_8H_{11}N$ | 178 |
| 2-isopropylpyridine | $C_8H_{11}N$ | 160 |
| 4-isopropylpyridine | $C_8H_{11}N$ | 178 |

TABLE 1-continued

| Chemical Name | Empirical Formula | $T_b$ (1 atm) (° C.) |
|---|---|---|
| 2-n-propylpyridine | $C_8H_{11}N$ | 166–168 |
| 4-n-propylpyridine | $C_9H_{11}N$ | 184–186 |
| 2-(t-butyl)pyridine | $C_9H_{11}N$ | 170 |
| 4-(t-butyl)pyridine | $C_9H_{13}N$ | 196 |
| 2-(1-ethylpropyl)pyridine | $C_{10}H_{15}N$ | 195 |
| 2-phenylpyridine | $C_{11}H_9N$ | 270 |
| 3-phenylpyridine | $C_{11}H_9N$ | 273 |
| 4-phenylpyridine | $C_{11}H_9N$ | 280 |
| 2-benzylpyridine | $C_{12}H_{11}N$ | 276 |
| 2-methoxypyridine | $C_6H_7NO$ | 142 |
| 4-methoxypyridine | $C_6H_7NO$ | 191 |
| 2-hydroxypyridine | $C_6H_7NO$ | 113 |
| 3-hydroxypyridine | $C_6H_7NO$ | 154 |
| 2-(2-hydroxyethyl)pyridine | $C_7H_9NO$ | 113 |
| 2-chloropyridine | $C_5H_4ClN$ | 170 |
| 3-chloropyridine | $C_5H_4ClN$ | 148 |
| 4-chloropyridine | $C_5H_4ClN$ | 147 |
| 2-chloro-6-methoxypyridine | $C_6H_6ClNO$ | 185–186 |
| 2-bromopyridine | $C_5H_4BrN$ | 193 |
| 3-bromopyridine | $C_5H_4BrN$ | 173 |
| 2-fluoropyridine | $C_5H_4FN$ | 126 |
| 3-fluoropyridine | $C_5H_4FN$ | 106 |
| 2-iodopyridine | $C_5H_4IN$ | >93 |

In addition to satisfying condition 2b that the boiling point $T_b$(1 atm) of the polycarbonate solvent at 1 atmosphere be at least 80° C. as indicated by the boiling point data given in Table 1, all of the preceding pyridine derivatives satisfy condition 2a that the melting point $T_m$(1 atm) of the solvent at 1 atmosphere be less than 20° C. Furthermore, it appears that all of these pyridine derivatives satisfy condition 2f that the acid dissociation constant of the protonated form of the polycarbonate solvent in aqueous solution be greater than $10^{-8}$ at 20° C. and 1 atmosphere.

The polycarbonate solvent may alternatively or additionally be formed with pyrrole or/and one or more ring-substituted pyrrole derivatives (hereafter, for simplicity, generally referred to in the singular as a ring-substituted pyrrole derivative). When the solvent utilizes pyrrole or/and a ring-substituted pyrrole derivative, the solvent likewise meets all the polycarbonate solvent criteria given above. Either pyrrole or the ring-substituted pyrrole derivative may be the primary constituent of the solvent when both constituents are present in the solvent and any other polycarbonate-dissolving constituent candidate is present at a lower mass fraction.

Both pyrrole and the ring-substituted pyrrole derivative can be chemically represented as:

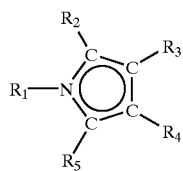

(11)

where each of $R_1$, $R_2$, $R_3$, $R_4$ and $R_5$ represents a monovalent substituent bonded covalently to the ring. Each of $R_1$ to $R_5$ is typically a hydrogen atom, a deuterium atom, a monovalent hydrocarbon group, a monovalent substituted hydrocarbon group, an acetyl group, a carboxaldehyde group, a halogen atom, or a monovalent pseudo-halogen substituent. For the hydrocarbon group or the substituted hydrocarbon group, the number of carbon atoms for each of $R_1$ through $R_5$ normally ranges from one to four.

Formula 11 yields pyrrole when each of $R_1$ through $R_5$ is hydrogen or deuterium. The empirical formula for pyrrole is $C_4H_5N$ in the fully hydrogen-substituted molecule. A ring-substituted pyrrole derivative is produced when at least one of $R_1$ through $R_5$ is a substituent other than hydrogen or deuterium, preferably one from the above list.

Several types of ring-substituted pyrrole derivatives are of special interest for use as the polycarbonate solvent. One type is the case in which $R_1$ is an alkyl group, preferably having from one to four carbon atoms. The remainder of $R_2$ through $R_5$ may consist of any of the monovalent covalent substituents given above, including hydrogen and deuterium.

For example, one ring-substituted pyrrole derivative having R1 as an alkyl group is 1-methylpyrrole (or N-methylpyrrole) for which the alkyl group is a methyl group (one carbon atom). The empirical formula for 1-methylpyrrole is $C_5H_7N$ in the fully hydrogen-substituted molecule. 1-methylpyrrole has a melting point $T_m$(1 atm) of approximately −57° C. at 1 atmosphere and a boiling point $T_b$(1 atm) of approximately 113° C. at 1 atmosphere. Consequently, conditions 2a and 2b are met with 1-methylpyrrole. 1-methylpyrrole, a much weaker base than pyridine, satisfies solvent condition 2f and the polycarbonate solubility requirements given above.

A second type of pyrrole derivative of special interest consists of those derivatives in which two adjacent substituent positions are taken up by a fused ring, i.e., a ring substituent which shares an edge with the pyrrole ring. A benz-fused example of this type of pyrrole derivative is given below:

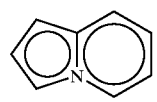

(12)

Substituents suitable for each ring carbon outside the fused edge in a fused-ring substituent derivative of pyrrole are the same as those described above for the fused-ring substituent derivatives of pyridine. Consequently, the substituent ring in a fused-ring substituent derivative of pyrrole may itself be substituted. The remainder of the substituent positions may be taken up by one or more of the substituent groups listed above for $R_1$ through $R_5$ in formula 11. Examples of appropriate benz-fused derivatives of special interest are the substituted indoles, formula 12.

When at least one of $R_1$ through $R_5$ in formula 11 is a halogen atom, the halogen can be fluorine, chlorine, bromine or iodine, with fluorine or chlorine being preferred substituents. In the case of pseudo-halogen substituents, the substituent is typically a nitrile group.

Aside from 1-methylpyrrole, other pyrrole derivatives of specific interest for use as the polycarbonate solvent in the liquid chemical formulation of the invention include the liquids given in the following table:

TABLE 2

| Chemical Name | Empirical Formula | $T_b$ (1 atm) (° C.) |
|---|---|---|
| 2-methylpyrrole | $C_5H_7N$ | 147 |
| 3-methylpyrrole | $C_5H_7N$ | 142 |
| 1-ethylpyrrole | $C_6H_9N$ | 129 |
| 2-ethylpyrrole | $C_6H_9N$ | 163 |

TABLE 2-continued

| Chemical Name | Empirical Formula | $T_b$ (1 atm) (° C.) |
|---|---|---|
| 2,4-dimethylpyrrole | $C_6H_9N$ | 171 |
| 2,5-dimethylpyrrole | $C_6H_9N$ | 170 |
| 2-isopropylpyrrole | $C_7H_{11}N$ | 171 |
| 1-propylpyrrole | $C_7H_{11}N$ | 145 |
| 1-butylpyrrole | $C_8H_{13}N$ | 170 |
| 1-tert-butylpyrrole | $C_8H_{13}N$ | 153 |
| 2,3-dimethyl-4-ethylpyrrole | $C_8H_{13}N$ | 198 |
| 2,4-dimethyl-3-ethylpyrrole | $C_8H_{13}N$ | 197 |
| 3-ethyl-2,4,5-trimethylpyrrole | $C_9H_{15}N$ | 213 |
| 1-phenylpyrrole | $C_{10}H_9N$ | 234 |
| 1-benzylpyrrole | $C_{11}H_{11}N$ | 247 |
| 1-acetylpyrrole | $C_6H_7NO$ | 181 |
| 2-acetylpyrrole | $C_6H_7NO$ | 220 |

Besides satisfying condition 2b that the boiling point of the polycarbonate solvent at 1 atmosphere be at least 80° C. as indicated by the boiling point data given in Table 2, all of the foregoing pyrrole derivatives satisfy condition 2a that the melting point $T_m(1\ atm)$ of the solvent at 1 atmosphere be less than 20° C. All of these pyrrole derivatives also appear to satisfy condition 2f that the protonated form of the polycarbonate have an acid dissociation constant greater than $10^{-8}$ at 20° C. and 1 atmosphere.

The polycarbonate solvent may alternatively or additionally be formed with pyrrolidine or/and one or more pyrrolidine derivatives (hereafter, for simplicity, generally referred to in the singular as a pyrrolidine derivative). When the solvent utilizes pyrrolidine or/and a pyrrolidine derivative, the solvent likewise meets all the polycarbonate solvent criteria given above.

Pyrrolidine and pyrrolidine derivatives can be chemically represented in general as:

(13)

where $R_1$ through $R_9$ represent covalently bonded substituents, with the maximum possible number of substituents being depicted in formula 13. In the parent compound pyrrolidine (probably of limited use here because of its excessive Bronsted basicity), $R_1$ through $R_9$ are hydrogen or deuterium atoms.

Substituents for $R_1$ through $R_9$ in formula 13 are typically chosen from hydrogen atoms, deuterium atoms, oxygen atoms, monovalent or bivalent hydrocarbon groups, monovalent or bivalent substituted hydrocarbon groups, acetyl groups, carboxaldehyde groups, halogen atoms, and monovalent pseudo-halogen substituents. For each hydrocarbon group or substituted hydrocarbon group, the number of carbon atoms for each of $R_1$ through $R_9$ normally ranges from one to four. Pyrrolidine derivatives which include one endocyclic double bond between ring atoms are also of interest.

Several pyrrolidine derivatives are of special interest for use as the polycarbonate solvent. For example, pyrrolidine derivatives of particular interest include those in which the ring nitrogen participates in, or is conjugated with, a multiple covalent bond, either endocyclicly or exocyclicly. Pyrrolidine derivatives having a covalent substituent ($R_1$) other than hydrogen or deuterium at the nitrogen position are also of particular interest. In pyrrolidine derivatives having a covalent substituent other than hydrogen or deuterium at the nitrogen position, the nitrogen atom may also be conjugated with a multiple covalent bond. All of these situations lead to a significant decrease in the basicity of the solvent compared to the parent compound, pyrrolidine.

Examples of such pyrrolidine derivatives having a double covalent bond are shown below:

(14)

(15)

(16)

where $R_{8/9}$ is a bivalent substituent such as oxygen. Aside from the limitations imposed by the double bond, substituents for $R_2$ through $R_9$ in formulas 14 through 16 can be chosen from any of those described above in connection with formula 13. Formula 14 illustrates the case in which the ring nitrogen participates in a double covalent bond. Formulas 15 and 16 illustrate the situations in which the ring nitrogen is conjugated respectively with an endocyclic double covalent bond and an exocyclic double covalent bond. For cases in which $R_1$ is not hydrogen or deuterium, formulas 15 and 16 constitute pyrrolidine derivatives in which a covalent substituent other than hydrogen or deuterium is at the nitrogen position.

For example, one pyrrolidine derivative chemically arranged according to formula 16 is 1-methylpyrrolidinone (or 1-methylpyrrolidone or N-methylpyrrolidone from which comes the common name NMP) whose empirical formula is $C_5H_9NO$. 1-methylpyrrolidinone has a methyl substituent ($R_1$) on the ring nitrogen, and one of the carbon atoms in the alpha position relative to the nitrogen atom is bonded to an oxygen atom via a conjugated exocyclic double bond as shown below:

(17)

1-methylpyrrolidinone has a melting point $T_m(1\ atm)$ of approximately −24° C. at 1 atmosphere and a boiling point $T_b(1\ atm)$ of approximately 202° C. at 1 atmosphere. Conditions 2a and 2b are therefore satisfied with 1-methylpyrrolidinone. 1-methylpyrrolidinone is a much weaker base than pyridine and thus satisfies solvent condition 2f. 1-methylpyrrolidinone also satisfies the polycarbonate solubility requirements given above.

When at least one covalent substituent in formula 13 is a halogen atom, the halogen can be fluorine, chlorine, bromine or iodine, with fluorine or chlorine being preferred substituents. In the case of pseudo-halogen substituents, the substituent is typically a nitrile group.

Aside from 1-methylpyrrolidinone, other pyrrolidine derivatives of specific interest for use as the polycarbonate solvent in the present liquid chemical formulation include the liquids given in the following table:

TABLE 3

| Chemical Name | Empirical Formula | $T_b$ (1 atm) (° C.) |
|---|---|---|
| 2-pyrrolidinone | $C_4H_7NO$ | 128 |
| 1-ethyl-2-pyrrolidinone (or N-ethylpyrrolidone) | $C_6H_{11}NO$ | 97 |
| 1-cyclohexylpyrrolidinone (or N-cyclohexylpyrrolidone) | $C_{10}H_{17}NO$ | 153 |

In addition to satisfying condition 2b that the boiling point of the polycarbonate solvent at 1 atmosphere be at least 80° C. as indicated by the boiling point data given in Table 3, all of the foregoing pyrrolidine derivatives satisfy condition 2a that the melting point $T_m$(1 atm) of the solvent at 1 atmosphere be less than 20° C. It also appears that all of these pyrrolidine derivatives satisfy condition 2f that the protonated form of the polycarbonate solvent have an acid dissociation constant greater than $10^{-8}$ at 20° C. and 1 atmosphere.

The polycarbonate solvent may alternatively or additionally be formed with either or both of chlorobenzene and cyclohexanone. The respective empirical formulas for these two liquids are $C_6H_5Cl$ and $C_6H_{10}O$. Chlorobenzene and cyclohexanone can be chemically represented respectively as:

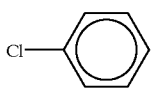

(18)

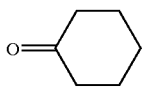

(19)

When the polycarbonate solvent utilizes chlorobenzene or cyclohexanone, the solvent meets all of the polycarbonate solvent criteria given above. Either of these liquids may be the primary constituent of the solvent when the other liquid is present in the solvent and any other polycarbonate-dissolving constituent candidate is present at a lower mass fraction.

Chlorobenzene, a monohalogenated benzene ring, is a weak (or soft) base. Chlorobenzene is largely insoluble in water. Nonetheless, the protonated form of chlorobenzene appears to have an acid dissociation constant greater than $10^{-8}$ in aqueous solution at 20° C. Accordingly, chlorobenzene satisfies condition 2f. The 1-atmosphere melting point $T_m$(1 atm) of chlorobenzene is approximately −46° C. Chlorobenzene therefore meets condition 2a that the 1-atmosphere melting point $T_m$(1 atm) of the polycarbonate solvent be less than 20° C. The 1-atmosphere boiling point $T_b$(1 atm) of chlorobenzene is approximately 132° C. Consequently, chlorobenzene meets condition 2b that the 1-atmosphere boiling point $T_b$(1 atm) of the solvent be no less than 80° C.

Cyclohexanone is also a weak base. The acid dissociation constant of the protonated form of cyclohexanone in aqueous solution appears to be greater than $10^{-8}$ at 20° C. Hence, cyclohexanone appears to satisfy condition 2f. The 1-atmosphere melting point $T_m$(1 atm) of cyclohexanone is approximately −16° C., enabling cyclohexanone to meet condition 2a. The 1-atmosphere boiling point $T_b$(1 atm) of cyclohexanone is approximately 156° C. so that cyclohexanone satisfies condition 2b.

Let the polycarbonate-dissolving liquid formed by one or more of pyrridine, a ring-substituted pyrridine derivative, pyrrole, a ring-substituted pyrrole derivative, pyrrolidine, a pyrrolidine derivative, chlorobenzene, and cyclohexanone be referred to as the "principal" solvent. Aside from the principal solvent and any other additive described above, the polycarbonate solvent may include, as a cosolvent, a liquid which enhances one or more properties of the polycarbonate solvent. For example, the cosolvent can reduce the boiling point of the overall polycarbonate solvent, thereby enabling the polycarbonate film to dry faster when it is manufactured in the manner described below. If advantageous, the cosolvent can also be utilized to increase the boiling point of the overall solvent. If the viscosity of a generally attractive implementation of the present liquid chemical formulation is undesirable high, the cosolvent can be employed to reduce the viscosity of the polycarbonate solvent, and vice versa.

The cosolvent can be employed to improve the tact time for the liquid polycarbonate-film created from the present liquid chemical formulation to become dry to the touch and relatively insensitive to moderate handling. The cosolvent can be utilized to enhance the leveling (upper surface flatness) of the liquid film and, consequently, the leveling of the final solid polycarbonate film created from the liquid film. In addition, the cosolvent can be employed to modify the flammability characteristics of the solid film.

Subject to generally avoiding liquids that are flammatory, toxic, carcinogenic, lachrymose, hygroscopic, and reactive, the cosolvent is normally chosen so as to not significantly reduce the ability of the polycarbonate solvent to dissolve the selected polycarbonate material, at least up to the desired concentration of the polycarbonate material in the liquid chemical formulation. The cosolvent may, in fact, improve the ability of the polycarbonate solvent to dissolve the polycarbonate material. In addition, the cosolvent is chosen so as to not react significantly with the polycarbonate material.

Choice of the cosolvent can be made by using the Hansen solubility parameter theory. The Hansen solubility parameter theory is described in Archer, *Industrial Solvents Handbook* (Marcel Dekker, Inc.), 1996, pages 1–4, 35–56, and 297–309, the contents of which are incorporated by reference herein. Hansen treats solubility in terms of a polar parameter, a dispersion (non-polar) parameter, and a hydrogen-bonding parameter. Application of the Hansen solubility parameter theory basically involves calculating the solubility parameters of the principal solvent and then selecting a cosolvent having similar solubility parameters.

In Barton, *CRC Handbook of Polymer-Liquid Interaction Parameters and Solubility Parameters* (CRC Press), 1990, page 444, bisphenol A homopolycarbonate is indicated as having a value of 0.8 for the polar parameter, 19.4 for the dispersion parameter, and 0 for the hydrogen-bonding parameter. The values for the polar and hydrogen-bonding parameters are low. This indicates that the overall polycarbonate solvent should generally be highly non-polar and exhibit little hydrogen bonding. Hence, the cosolvent should generally be a highly non-polar liquid with little hydrogen bonding.

Depending on the particular type of polycarbonate material dissolved in the present liquid chemical formulation, particularly attractive candidates for the cosolvent generally are methoxybenzene (anisole), ethyl lactate, cyclopentanone, mesitylene, and hexyl acetate (2-methyl-1- pentyl acetate). For example, when 1-methylpyrrolidinone is the principal solvent, the cosolvent can be methoxybenezene or ethyl lactate.

Other candidates for the cosolvent are decalin (mixed cis and trans isomers), transdecalin, benzene, xylene (mixed isomers), tetralin, ethyl benzene, toluene, o-xylene, p-xylene, cyclohexane, 1-methylnaphthalene, 4-isopropyltoluene (p-cymene), diisopropyl naphthalene (1,4 and 2,6 isomers), n-eicosane, n-hexadecane, furan, methycyclohexane, diethyl carbonate, n-decane, n-nonane, Texasolve s-66 (mineral spirits), Texasolve s (mineral spirits), 1,4-dioxane (p-dioxane), n-octane, Texasolve s-lo (low aromatics/odor mineral spirits), Eastman C-11 ketone, methylcyclopentane, Texasolve c (commercial heptane), heptane, alpha-pinene (+/−, racemic), diisobutyl ketone, Texasolve h (hexane-heptane combination), acetophenone, ethyl cinnamate, n-ethylmorpholine, dioctyl phthalate, isopropylbenzene (cumene), n-hexane, Texasolve v (vm&p naphtha), Texasolve b (commercial hexane), 1,2-dodecane carbonate, ethyl caprate (ethyl decanoate), tri-n-butyl phosphate, methyl isoamyl ketone, di-n-butyl phthalate, 1,2-decane carbonate, ethyl caprylate (ethyl octanoate), Exxate 1300 (tridecyl acetates), benzonitrile, n-pentane, 3-methylpentane, n-butyl acetate, 4-methyl-3-pentene-2-one (mesityl oxide), propylene glycol methyl butyl ether, methyl amyl acetate, 2-methylpentane, morpholine, ethyl caproate (ethyl hexanoate), amyl acetate, diethyl phthalate, 2,3-dimethylbutane, methyl isobutyl ketone, Exxate 1000 (decyl acetates), dipropylene glycol methyl ether acetate, 2,2,4-trimethylpentane, methyl caproate, isobutyl isobutyrate, n-butyl stearate, tetrahydrofuran, propylene gycol methyl ether acetate, n-amyl acetate, 1,2-cyclohexane carbonate, dibutylene glycol n-butyl ether, methyl oleate, n-butyl benzyl phthalate, dibasic ester, diethylketone, 1,2-hexane carbonate, tetraethylene glycol dimethyl ether (tetraglyme), triethylene glycol dimethyl ether (triglyme), isobutyl acetate, aniline, ethyl acetate, ethylene glycol dibutyrate, diethylene glycol butyl ether acetate, ethyl ether, propylene glycol methyl ethyl ether, Exxate 900 (nonyl acetates), isobutyl heptyl ketone, dimethyl phthalate, dipropylene glycol methyl butyl ether, dipropylene glycol n-hexyl ether, isopropyl palmitate, butylene glycol dimethyl ether, methyl n-hexyl ketone, 2,2-dimethylbutane, nonylphenol, isopentane (2-methylbutane), methyl n-butyrate, ethylene glycol dimethyl ether (glyme), di-n-propyl carbonate, 1-nitropropane, triethylene glycol butyl ether, tripropylene glycol methyl butyl ether, Exxate 800 (octyl acetates), n-methylmorpholine, n-propyl acetate, propylene glycol diacetate, diethyl succinate, methyl ethyl ketone, dipropylene glycol dimethyl ether, butylene glycol propylene glycol n-butyl ether, propylene glycol butylene glycol n-butyl ether, isophorone, ethylene glycol butyl ether acetate, tripropylene glycol n-butyl ether, isopropyl acetate, ethylene glycol hexyl ether, propylene glycol ethylene glycol n-butyl ether, 1,2-butylene carbonate, propylene glycol dimethyl ether, di-n-butyl sebacate, propylene glycol n-hexyl ether, Exxate 700 (heptyl acetates), tricresyl phosphate, propylene glycol phenyl ether, isopropyl ether, methyl acetate, Exxate 600 (hexyl acetates), methyl t-butyl ether, ethylene glycol propylene glycol n-butyl ether, diethylene glycol dimethyl ether (diglyme), ethyl n-amyl ketone, triethylene glycol n-propyl ether, dipropylene glycol n-butyl ether, tripropylene glycol n-propyl ether, 3-isopropyl-2-oxazolidinone, butylene glycol n-butyl ether, ethylene glycol ethyl ether acetate, methyl n-propyl ketone, dimethyl carbonate, methyl isopropyl ketone, ethylene glycol 2-ethylhexyl ether, propylene glycol t-butyl ether, ethyl formate, triethylene glycol ethyl ether, n-butyl lactate, diethylene glycol butyl ether, 1-isopropyl-2-methyl imidazole, tripropylene glycol isopropyl ether, ethyl-3-ethoxypropionate, tripropylene glycol ethyl ether, ethyl n-butyl ketone, diisobutylcarbinol, ethylene glycol n-butyl ether, ethylene glycol methyl ether acetate, dipropylene glycol n-propyl ether, propylene glycol n-butyl ether, methyl n-butyl ketone, 2-ethyl hexyl acetate, diethylene glycol n-propyl ether, butylene glycol n-propyl ether, methyl isobutyl carbinol, tripropylene glycol methyl ether, triethylene glycol methyl ether, triethyl phosphate, butyronitrile, dipropylene glycol ethyl ether, propylene glycol n-propyl ether, n,n-dimethyl acetamide, dipropylene glycol isopropyl ether, 2-ethyl-1-butanol, butylene glycol ethyl ether, diethylene glycol methyl ether, and acetic acid.

The cosolvent is normally present in the polycarbonate solvent at a lower mass fraction than the principal solvent. The cosolvent is normally introduced into the polycarbonate solvent after the polycarbonate material has been dissolved in the principal solvent. Nonetheless, the cosolvent and the principal solvent can be combined after which the polycarbonate material is dissolved in the combined liquid.

Polycarbonate Film Preparation

Figure 3:
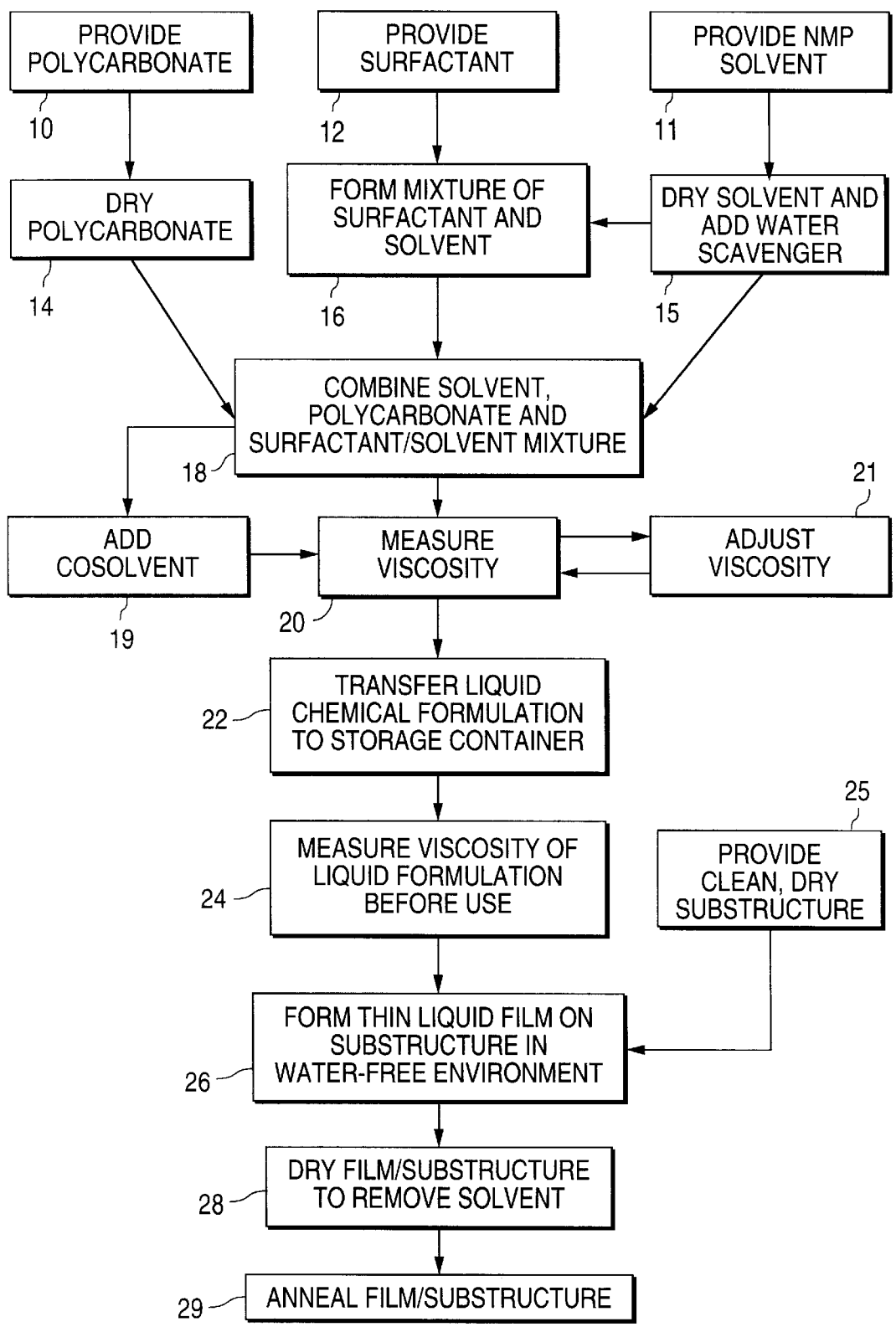
FIG. 3 is a flow chart of a process for producing a polycarbonate-containing liquid chemical formulation in accordance with the invention and then utilizing the liquid formulation to make a solid, largely polycarbonate film according to the invention.

FIG. 3 presents a flowchart of the principal steps involved in preparing a polycarbonate-containing liquid chemical formulation in accordance with the invention and then using the liquid formulation to make a thin, solid polycarbonate film according to the invention's teachings. FIG. 3 illustrates the preferred case in which the principal solvent consists substantially of 1-methylpyrrolidinone (again, NMP).

The first steps in making the polycarbonate film are, as indicated in blocks 10, 11 and 12 of FIG. 3, to provide: (a) polycarbonate material, (b) a principal solvent formed with 1-methylpyrrolidinone, and, optionally, (c) a surfactant. The principal solvent preferably consists of essentially 100% 1-methylpyrrolidinone and has a low water content. Alternatively, the principal solvent can consist of essentially 100% pyridine at a low water content. In either case, the principal solvent constitutes the full polycarbonate solvent when no cosolvent is used.

The polycarbonate material typically consists of a granulated MAKROLON polycarbonate, preferably MAKROLON 2608 homopolycarbonate formed with bisphenol A carbonate repeat unit, or a granulated copolycarbonate, typically a bispolycarbonate in which the primary repeat unit is bisphenol A carbonate repeat unit. If the granules of the polycarbonate material are not sufficiently fine as originally supplied, the polycarbonate material is ground until a suitably small average granule size is reached. The surfactant, when used, preferably is Fluorad FC-430 polymeric ester mixture.

If the polycarbonate material is not water-free, it is dried in a water-free environment, typically overnight in flowing dry nitrogen between 120° C. and 125° C., as indicated in block 14. The water content of the polycarbonate material is thereby reduced to a value typically less than 0.01% by mass. If other solid materials are to be present in the liquid chemical formulation, they are dried similarly. Suitable methods for drying and handling water-sensitive and air-sensitive materials are described in Shriver et al., *The Manipulation of Air-Sensitive Compounds* (John Wiley & Sons), 1986. Also see "Handling air-sensitive reagents," *Tech. Bull. AL*-134, Aldrich Chemical Co., December 1994, 8 pages.

If the water content of the principal solvent is too great, the principal solvent is normally dried, block 15. Standard methods may be used. For example, the principal solvent may be treated with vacuum-dried molecular sieves followed by distillation under an inert, dry atmosphere. After drying the principal solvent, a water scavenger is added to the principal solvent. The water scavenger typically consists of acetic anhydride at a concentration of 0.1–1%, typically 0.2%, by mass of the polycarbonate solvent.

When a surfactant is to be used, a stock liquid mixture (substantially a solution) of the surfactant and the dried, water scavenged, principal solvent is prepared by combining a weighed portion of the surfactant with an aliquot of the dried principal solvent under an inert atmosphere. See block 16 of FIG. 3.

The substantially dry polycarbonate material, possibly one or more other dry solid materials, the substantially dry principal solvent, and, when a surfactant is to be used, an aliquot of the stock surfactant/solvent mixture, are now combined in a water-free environment, typically dry nitrogen. Block 18 illustrates this step, described further below. If no cosolvent is used, the resulting polycarbonate-containing liquid constitutes the liquid chemical formulation of the invention. Depending on whether the cosolvent is, or is not, used, the mass percentage of polycarbonate in the principal solvent is chosen to yield a solid polycarbonate film thickness in the range of 0.1 $\mu$m to 2 $\mu$m with the thickness uniformity described previously.

In combining the preceding solid and liquid materials, the dry principal solvent is transferred to a clean, dry, weighed container using Schlenck transfer methods, typically under dry nitrogen. The container is weighed to determine the mass of principal solvent. The aliquot of surfactant/solvent mixture is also transferred using Schlenck methods, and its mass is determined by a difference technique. Finally, the dry polycarbonate material is loaded into the container, again using Schlenck transfer techniques, and the mass of the polycarbonate material is determined by a difference technique. Any other solids are added, and their masses are determined in a similar manner.

If magnetic stirring is to be used to mix the polycarbonate-containing liquid, an appropriate magnetic stirring bar is added at this time. Finally, the container is sealed under a slight positive pressure of inert dry gas, typically dry nitrogen. The constituents of the polycarbonate-containing liquid are mixed for a sufficient time to form a homogeneous liquid. Up to 3 days may be needed to dissolve all the dissolvable solid material at an ambient temperature of 20° C. using slow magnetic stirring.

If a cosolvent is to be used, the cosolvent is normally added to the polycarbonate-containing liquid after the polycarbonate material has been dissolved in the principal solvent. See block 19. The cosolvent can also be added after the principal solvent and the polycarbonate material have been combined but before the polycarbonate material is fully dissolved in the principal solvent. For some implementations of the cosolvent, the cosolvent can be combined with the principal solvent before adding the polycarbonate material. In any event, the combination of the cosolvent with the polycarbonate material, the principal solvent, and any other added liquid or solid material now forms the present liquid chemical formulation.

After all the polycarbonate and other dissolvable solid materials have been dissolved, the kinematic viscosity of the liquid chemical formulation is determined as indicated in block 20 of FIG. 3. The kinematic viscosity of the solution may be adjusted, block 21, by adding more of the dried principal solvent and/or the cosolvent to decrease viscosity, by adding more dry polycarbonate to increase viscosity, or by mixing two or more liquid chemical formulations of different kinematic viscosities made from the same polycarbonate material. All such operations are performed under inert-atmosphere conditions and are followed by thorough mixing of the resulting polycarbonate-containing liquid formulation.

After any necessary changes have been made to the kinematic viscosity of the liquid chemical formulation, the liquid formulation is transferred to a dry container, typically under a slight positive pressure of dry, inert gas, typically dry nitrogen. Block 22 in FIG. 3 indicates this step. The container is sealed gas-tight and the formulation is stored, preferably at or below normal room temperature to minimize chemical degradation of the polycarbonate material through hydrolysis or other reactions.

The fabrication of the polycarbonate film begins with the determination of the kinematic viscosity of the polycarbonate-containing liquid chemical formulation immediately prior to use, block 24. Significant changes in the kinematic viscosity of the liquid formulation during storage are indicative of chemical or physical degradation. Degradation of the formulation may affect the quality of polycarbonate films made with the formulation.

Measurements of kinematic viscosity can be performed in a number of ways. For example, a sample of the liquid chemical formulation may be removed and tested. A viscosity measurement device can be incorporated into the liquid formulation dispensing equipment. Viscosity can be measured indirectly by the preparation of witness samples of polycarbonate films whose thicknesses are compared to a calibration curve.

The polycarbonate film is formed on a clean, dry substructure, block 25. The substructure is typically cleaned of surface dirt and particles, degreased by washing in appropriate non-aqueous organic solvents and dried at temperature greater than 100° C. in a flow of inert gas. If necessary, the surface can be oxidized, once cleaned, to improve wetting by the liquid chemical formulation of the invention. It is important that the liquid formulation wet the surface of the substructure at a contact angle significantly less than 90°, preferably approaching 0°.

Assuming that the kinematic viscosity of the liquid chemical formulation is acceptable, a portion of the liquid formulation is delivered to the surface of the substructure in a substantially water-free environment, typically dry nitrogen. See block 26 of FIG. 3. As indicated above, the formulation can be delivered to the substructure in various ways, including spin coating, extrusion coating, extrusion-spin coating, and meniscus coating.

First consider spin coating. The volume of liquid chemical formulation delivered to the substructure for spin coating is normally in excess of the volume of uniform liquid film needed to achieve the desired final solid film thickness. The liquid formulation is normally delivered in a slow stream at the center of rotation of the substructure in such a way that gas bubbles are not formed or entrained in the delivered formulation. The substructure may be stationary or slowly rotating during the dispensing of the formulation.

While keeping the resulting structure in the substantially water-free environment, the substructure is spun on an axis normal to its surface to convert the portion of liquid chemical formulation on the substructure into a thin polycarbonate-containing liquid film. The rotation speed of the substructure is normally 1000 to 3000 rpm, typically 1100 to 1200 rpm, when the polycarbonate material is MAKROLON 2608 at a concentration of approximately 75 g/kg polycarbonate solvent, and the polycarbonate solvent is pyridine (with no cosolvent). The angular acceleration is high enough to prevent uneven spreading of the polycarbonate-containing liquid chemical formulation over the substructure due to viscous fingering of the liquid formulation, yet low enough to permit adequate wetting of the substructure as the perimeter of the dispensed formulation spreads over the surface of the substructure. The delivery of liquid formulation and spin coating operations are preferably done in a continuous sequence. During the spinning operation, a large fraction of the polycarbonate solution is normally spun off the substructure while the solvent evaporates from the remainder of the liquid film.

Figure 4:
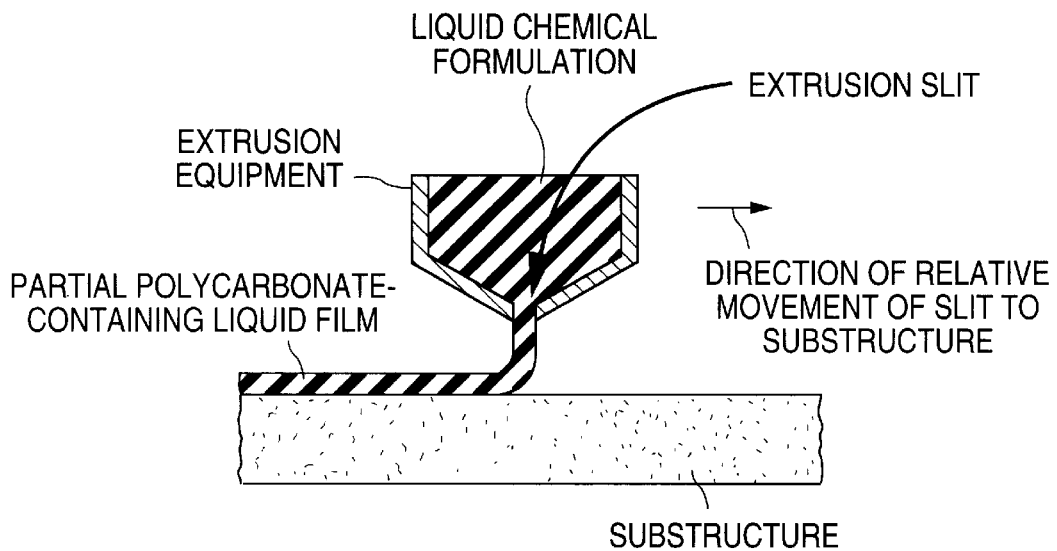
FIG. 4 is a cross-sectional schematic diagram of a system for creating a liquid polycarbonate-containing film by extrusion coating.

In extrusion coating, the substructure is positioned at a largely fixed distance physically below a slit in an extrusion system. FIG. 4 schematically illustrates a cross section of the extrusion system and the substructure. With the substructure in the substantially water-free environment, a portion of the liquid chemical formulation passes through the extrusion slit and accumulates as a sheet on the substructure as the substructure moves laterally at largely a fixed speed relative to the slit. The formulation dispenser can move while the substructure is stationary. Alternatively, the substructure can move while the formulation dispenser is stationary. In contrast to spin coating where a large fraction of the polycarbonate solution is normally spun off the substructure during the spinning operation, little of the polycarbonate solution is wasted during the extrusion coating operation.

The thickness of the liquid polycarbonate-containing film depends primarily on the relative slit-to-substructure speed, the slit width (i.e., the slit dimension in the direction of the relative slit-to-substructure speed), and the speed of the liquid chemical formulation as it passes through the slit. The characteristics of the liquid film also depend on the slit-to-substructure distance, the slit length, and the side-to-side flow uniformity. The slit-to-substructure distance is typically greater than the (desired) thickness of the deposited liquid film but is not so great as to cause discontinuities in the vertical liquid sheet formed as the liquid formulation passes through the slit. The timing and geometry of the extrusion coating operation are controlled so that (a) very little, preferably none, of the liquid formulation flows beyond the edges of the substructure and (b) the film thickness at the leading and trailing edges of the liquid film does not differ significantly from the average thickness across the bulk of the liquid film.

When the polycarbonate material consists of MAKROLON 2608 at a concentration of 5–12%, preferably 8–9%, by mass of the liquid chemical formulation, the kinematic viscosity of the liquid formulation is typically 20–80 centistokes, preferably 30–45 centistokes, at 20° C. and 1 atmosphere in the case of extrusion coating. The slit-to-substructure speed is 2–12 mm/sec., typically 5 mm/sec. The slit-to-substructure distance is 50–75 $\mu$m. The slit width is 50–100 $\mu$m, typically 0.75 $\mu$m. The volumetric rate for delivering the liquid formulation to the substructure is a function of the slit width, the slit length, and the speed of the liquid formulation in passing through the slit, where the liquid speed depends on the viscosity of the liquid formulation and the pressure across the liquid formulation in the extruding equipment. For a typical slit length of 320 mm, the volumetric deliver rate is 10–30 $\mu$l/sec.

Extrusion-spin coating is basically a combination of extrusion coating and spin coating. Extrusion coating is first utilized to form a precursor film of the liquid chemical formulation on the substructure. The substructure and overlying precursor liquid film are then rotated to smoothen the liquid film.

Meniscus coating is largely the opposite of extrusion coating. In meniscus coating, the substructure is positioned at a largely fixed distance physically above a slit in the meniscus-coating equipment. The liquid chemical formulation passes through the meniscus slit and accumulates as a sheet on the substructure as the substructure is moved laterally relative to the slit.

The liquid film and the underlying substructure are dried to remove the polycarbonate solvent and any other volatile components of the film as indicated in block 28 of FIG. 3. The drying operation can be performed at room temperature or at an elevated temperature and/or reduced pressure, typically as low as 0.001 atmosphere, to reduce the drying time. For example, when a pyridine-based liquid formulation containing MAKROLON 2608 is spin coated on the substructure, the liquid film can be dried at room temperature by placing the structure on a dry air-vented hotplate at 125° C. for 30 sec. In the case of extrusion coating where the liquid film is normally much wetter than an otherwise comparable spin-coated polycarbonate-containing liquid film, the extruded liquid film can be vacuum dried or baked at a low temperature to prevent thermally caused film thickness variation. The extruded liquid film is typically soft baked at 60–90° C., preferably 75° C., for 5 min. at room pressure. In either case, the polycarbonate film is produced as a microcrystalline solid, i.e., in a glassy state.

The rate at which the volatile components evaporate from the polycarbonate-containing liquid film increases as the drying pressure decreases. If reduced pressure is employed during the drying procedure to reduce the drying time, the polycarbonate-containing liquid film is placed in a vacuum chamber attached to a suitable vacuum pumping system. The lowest chamber pressure to which the liquid film is subjected by the vacuum system during the drying operation is, as indicated above, typically in the vicinity of 0.001 atmosphere.

The polycarbonate material remaining after the drying step is in the form of a uniform, thin, normally microcrystalline solid film. The solid film may also contain other non-volatile solid materials or reaction products as minor components, as described previously. Except when the present liquid chemical formulation has been provided with an additive (e.g., a black dye) to make the solid film opaque, the solid film is normally transparent. Typically, the thickness and thickness uniformity of the solid polycarbonate film are now tested to determine whether those parameters fall within the desired range of values. In some applications, the drying and testing operations complete the polycarbonate film manufacturing process. If a high degree of uniformity is needed in polycarbonate density, further processing of the film is performed as described below.

In other applications, the polycarbonate film is annealed at a temperature sufficiently high to reduce stress in the solid film. See block 29 in FIG. 3. The final polycarbonate film preferably has a generally amorphous structure. The annealing of the solid polycarbonate film can encompass the drying operation, or can be performed as a separate operation after the film is dried.

The physical microstructure of the polycarbonate material changes during the annealing operation. However, the chemical make-up of the polycarbonate material remains substantially the same. If the film was transparent at the end of the drying operation, the film normally remains transparent through the anneal. The annealing operation typically improves the adhesion of the polycarbonate film to the substructure as well as the optical uniformity of the film while decreasing birefringence. If the substructure is not perfectly planar, the anneal also improves the degree of planarization of the outside surface of the polycarbonate film, although at the expense of film thickness uniformity.

As the temperature of polycarbonate material is progressively increased, a point is eventually reached at which the polycarbonate material flows readily. The annealing operation of the present invention is normally performed so that the maximum temperature reached by the polycarbonate film during the anneal is 85–95%, typically 90%, of the absolute temperature at which the polycarbonate material starts to readily flow. MAKROLON 2608 starts to readily flow at a temperature in the vicinity of 240° C. (510–515 K). Hence, the maximum temperature that the solid polycarbonate film reaches during the anneal is typically approximately 190° C. (460–465 K) when the polycarbonate film is created from MAKROLON 2608.

It is preferable to anneal the polycarbonate film in a suitable oven, although a hot plate or other method of heating in a controlled environment may be used. When the polycarbonate film is created from MAKROLON 2608, the annealing typically entails placing the structure formed with the substructure and the overlying solid polycarbonate film in an annealing oven at an initial temperature below the glass transition temperature of the polycarbonate material in the film. The initial oven temperature is typically 100° C. when the polycarbonate film is created from MAKROLON 2608 whose glass transition temperature is approximately 145° C. The oven is otherwise filled with nitrogen at approximately room pressure.

The oven temperature is ramped from the initial temperature up to approximately 190° C. at a rate of 1° C./min. to 10° C./min., typically 5° C./min. The oven temperature is maintained at 190° C. for an annealing period in the vicinity of 1 hr. During the annealing period, the polycarbonate film reaches, or substantially reaches, 190° C. The oven temperature is then reduced at a rate of –10° C./min. to –1° C. min., typically –5° C./min., to a final oven temperature below the glass transition temperature of the polycarbonate material used to create the polycarbonate film. In the case of MAKROLON 2608, the final oven temperature is typically 100° C. The annealed structure is removed from the oven and permitted to cool naturally down to room temperature.

Figure 5:
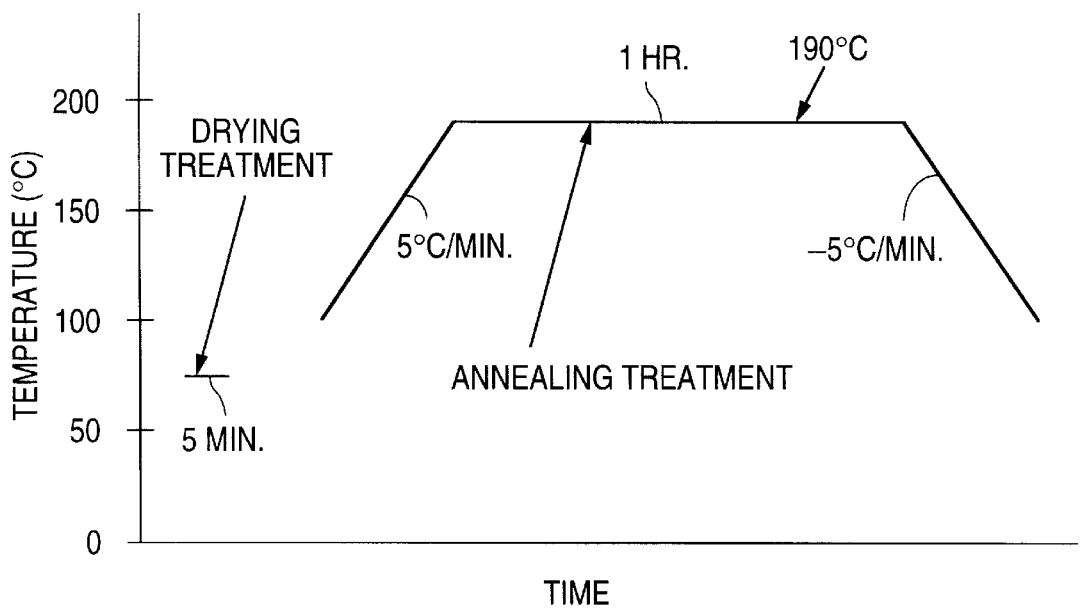
FIG. 5 is a graph which illustrates a thermal profile employed in converting a liquid polycarbonate-containing film into a solid, annealed polycarbonate film.

FIG. 5 graphically illustrates how the oven temperature varies for annealing a polycarbonate film formed with MAKROLON 2608 when the ramp-up and ramp-down rates respectively are 5 and –5° C./min. FIG. 5 also illustrates the typical earlier drying step at the preferred temperature of 75° C. The example of FIG. 5 applies specifically to the situation in which the film is created by extruding the liquid chemical formulation when the polycarbonate solvent consists largely of 1-methylpyrrolidinone. However, the example of FIG. 5 can apply to other implementations of the polycarbonate solvent and other types of film deposition techniques.

An anneal procedure similar to that described above is employed when the polycarbonate film is formed from polycarbonate material, such as copolycarbonate, other than MAKROLON 2608. To the extent that such other polycarbonate material begins to flow readily at a temperature significantly different from 240° C., the maximum oven temperature is adjusted in accordance with the above guidelines. By annealing the solid polycarbonate film in this way, crystallinity of the final film is kept to a minimum. The anneal of the polycarbonate film produce an isotropic glass with highly uniform density and near-minimum birefringence.

FIGS. 6a–6d (collectively "FIG. 6") pictorially illustrate how the present polycarbonate-containing liquid chemical formulation is applied to the substructure and then processed to make the polycarbonate film. In particular, the processing steps of blocks 26 and 28 of FIG. 3 are largely shown in FIG. 6.

Figure 6A:
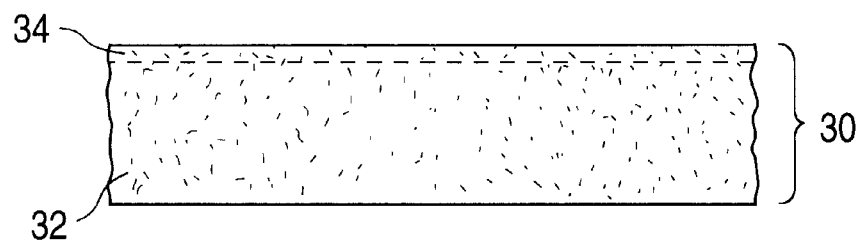
FIGS. 6a–6d are cross-sectional views illustrating operations performed on a substructure to create a polycarbonate film according to the process of FIG. 3.

The starting point in FIG. 6a is a substructure 30 whose primary constituent is typically a body 32 of electrically non-insulating material. Body 32 and substructure 30 typically consist of electrically conductive and/or semiconductive material. Alternatively, body 30 may partially or wholly consist of electrically insulating material which may be coated with non-insulating material, or body 30 may be entirely composed of insulating material. An adhesion-promoting or wetting layer 34 is optionally situated along the upper surface of body 32. In any event, substructure 30 is usually in the shape of a plate having a substantially flat upper surface.

Figure 6B:
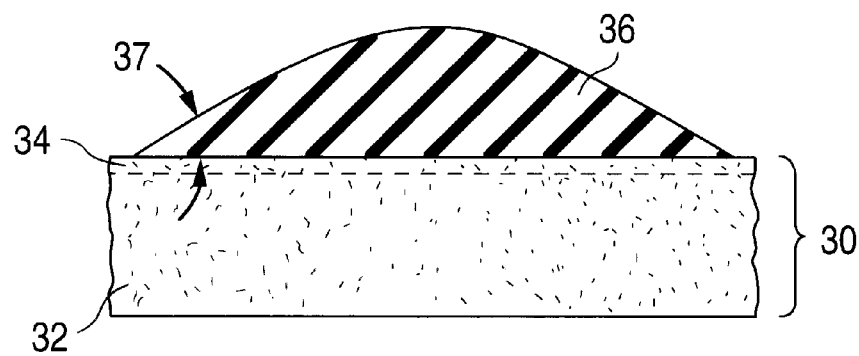

When the polycarbonate-containing liquid film is created by spin coating, a portion 36 of the polycarbonate-containing liquid chemical formulation is deposited on top of substructure 30 as indicated schematically in FIG. 6b. The wetting of polycarbonate-containing liquid portion 36 on substructure surface 32 should, as indicated in FIG. 6b, be such that the contact angle 37 of portion 36 is substantially less than 90°. Either during or subsequent to the delivery of portion 36 of the liquid chemical formulation, the structure formed by substructure 30 and liquid portion 36 is spun using a suitable apparatus to convert portion 36 into a polycarbonate-containing liquid film 36A of the liquid formulation. See FIG. 6c. By appropriately controlling the speed, acceleration and duration of rotation, the kinematic viscosity of the formulation, and the concentration of the polycarbonate and other solid material such as surfactant, liquid film 36A achieves a highly uniform thickness across the substructure.

Figure 6C:
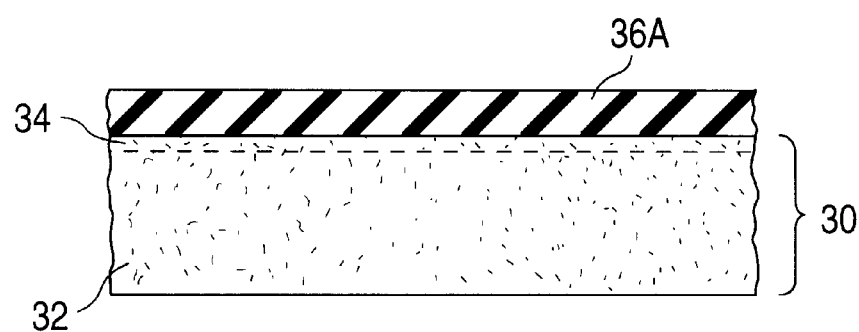

The process sequence jumps from the stage of FIG. 6a to the stage of FIG. 6c when a portion of the liquid chemical formulation is deposited on substructure 30 by extrusion coating. Item 36A is the polycarbonate-containing liquid film created by extrusion coating. Largely the same occurs when extrusion-spin coating or meniscus coating is employed to deposit a portion of the liquid formulation on substructure 30 except that, in the case of extrusion-spin coating, substructure 30 and an overlying extruded precursor to liquid film 36A are spun to further flatten the extruded precursor and convert it into liquid film 36A. In the structure of FIG. 6c, liquid film 36A has substantially all of the characteristics of the liquid chemical formulation of the invention.

Figure 6D:
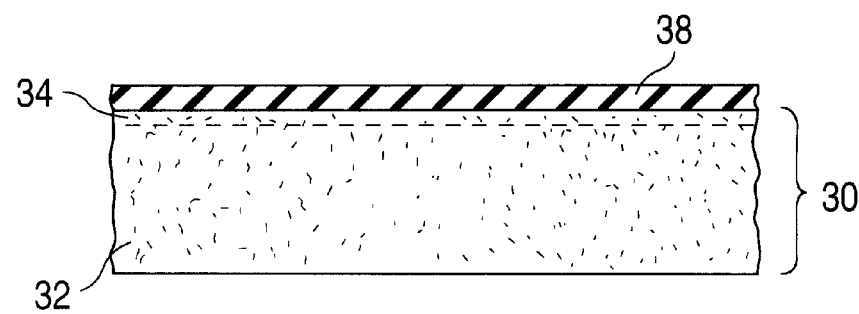

The liquid chemical formulation is then processed to remove the polycarbonate solvent and any other volatile constituents. Liquid film 36A is thus converted into a solid polycarbonate film 38 as shown in FIG. 6d. This transformation is accomplished during the drying and/or annealing operations described above. Polycarbonate film 38 is now ready for use in a desired application.

Experiments

Liquid films of samples of the present liquid chemical formulation were created on the upper surfaces of largely identical chromium-coated glass substructures. Each substrate consisted of a circular glass substrate of 100-cm diameter and an overlying layer of chromium deposited by evaporation to a thickness of approximately 40 nm on the substrate. Standard mixing/homogenization techniques were employed in each instance of mixing polycarbonate material and polycarbonate solvent. All film thicknesses were measured with a Dektak film thickness measurement system.

Experiment A—MAKROLON 2608 and Pyridine with Spin Coating

Five different samples SA1–SA5 of the liquid chemical formulation of the invention were prepared with MAKROLON 2608 polycarbonate and pyridine to achieve respective polycarbonate mass concentrations of approximately 5, 6, 7, 8 and 9% of the liquid formulation. Specifically, 0.81, 0.97, 1.13, 1.29 and 1.48 g of MAKROLON 2608 were respectively mixed with 14.7, 14.8, 14.9, 14.9 and 14.7 g of dried (anhydrous) pyridine until formulations SA1–SA5 were respectively formed as stable solutions at 54.8, 65.2, 75.5, 86.9 and 99.7 g polycarbonate/kg pyridine. The kinematic viscosities of formulations SA1–SA5 were respectively measured at 6.2, 8.3, 10.9, 14.4 and 19.8 centistokes. The kinematic viscosity data for formulations SA1–SA5 is presented in FIG. 1.

5-ml portions of formulations SA1–SA5 were respectively spun onto five of the chromium-coated glass substructure s for 30 sec. at respective spin speeds of 1010, 1010, 1020, 1050 and 1000 rpm to produce five liquid films from formulations SA1–SA5. The five liquid films were dried for 10 sec. at 120° C. with a hot plate to produce solid polycarbonate films. The dried polycarbonate films were then annealed at 155° C. for 15 min. under dry nitrogen and then at 155° C. for 45 min. under a vacuum at approximately 10 torr. The thicknesses of the resultant five annealed solid polycarbonate films created from formulations SA1–SA5 were respectively measured at 440, 630, 800, 1,000 and 1320 nm.

Experiment B—MAKROLON CD2005 and Pyridine with Spin Coating

Five different samples SB1–SB5 of the present liquid chemical formulation were prepared with MAKROLON CD2005 polycarbonate and pyridine to achieve respective polycarbonate mass concentrations of approximately 5, 6, 7, 8 and 9% of the liquid formulation. Specifically, 0.81, 0.95, 1.14, 1.28 and 1.46 g of MAKROLON CD2005 were respectively mixed with 15.1, 15.0, 15.1, 14.9 and 15.0 g of dried pyridine until formulations SB1–SB5 were respectively formed as stable solutions at 53.6, 63.4, 75.4, 86.2 and 97.7 g polycarbonate/kg pyridine. The kinematic viscosities of formulations SB1–SB5 were respectively measured at 4.0, 4.9, 6.5, 8.1 and 10.1 centistokes. The kinematic viscosity data for formulations SB1–SB5 is presented in FIG. 1.

5-ml portions of formulations SB1–SB5 were respectively spun onto five of the chromium-coated glass substructures for 30 sec. at respective spin speeds of 1,000, 1,000, 1,010, 990 and 990 rpm to produce five liquid films from formulations SB1–SB5. After thermally processing the liquid films in the manner specified in Experiment A, the thicknesses of the resultant five annealed solid polycarbonate films created from formulations SB1–SB5 were respectively measured at 380, 480, 640, 750 and 940 nm.

Experiment C—MAKROLON 2608 and 1-methylpyrrolidinone with Extrusion Coating

Three different samples SC1–SC3 of the present liquid chemical formulation were prepared with MAKROLON 2608 polycarbonate and 1-methylpyrrolidinone to achieve respective polycarbonate mass concentrations of approximately 6, 7, and 10% of the liquid formulation. Specifically, 236, 437, and 469 g of MAKROLON 2608 were respectively mixed with 3702, 5465, and 4376 g of dried 1-methylpyrrolidinone until formulations SC1–SC3 were respectively formed at 68, 87, and 120 g polycarbonate/kg 1-methylpyrrolidinone. The kinematic viscosities of formulations SC1–SC3 were respectively measured at 13, 34, and 75 centistokes.

Portions of formulation SC3 (10% MAKROLON 2608 polycarbonate) were extrusion coated onto a number (more than 20) of the chromium-coated glass substructure s at a volumetric delivery rate of 12–14 $\mu$l/sec. and slit-to-substructure speeds of 2, 5, and 10 mm/sec. with the objective of achieving respective dry film thicknesses of approximately 1.3, 0.9, and 0.3 $\mu$m. The slit width was approximately 45 $\mu$m. The slit-to-substructure distance was varied from 50 $\mu$m to 150 $\mu$m. The most uniform liquid film was achieved at the slit-to-substructure speed of 5 mm/sec.

Portions of formulations SC1–SC3 were extrusion coated onto a number of the chromium-coated glass substructures at respective volumetric delivery rates of 14, 19, and 24 $\mu$l/sec with the objective of obtaining a dry film thickness of approximately 0.9 $\mu$m. The slit width was varied from 50 $\mu$m to 100 $\mu$m. The slit-to-substructure distance was varied from 50 $\mu$m to 75 $\mu$m. The slit-to-substructure speed was 5 mm/sec.

The liquid polycarbonate-containing films created at the slit-to-substructure speed of 5 mm/sec. were variously dried at 60, 75, and 90° C. for 5 min. The most homogeneous appearance, corresponding to the lowest thermal imaging, was observed for the films dried at 75° C.

The so-dried polycarbonate films were subsequently annealed at 190° C. for 1 hr. The structures having some of the dry films were simply loaded into the annealing oven while it was at 190° C. At the end of the anneal period, these structures were removed from the annealing oven and permitted to cool naturally to room temperature. The structures having others of the dry films were loaded into the annealing oven while it was at 100° C. The oven temperature was then ramped up to 190° C. at 5° C./min. At the end of the 1-hr. anneal period, the oven temperature was ramped from 190° C. down to 100° C. at –5° C./min. after which the structures were removed from the anneal oven and permitted to further cool down naturally.

Experiment D—MAKROLON 2608, 1-methylpyrrolidinone, and Water Scavenger

Two different samples SD1 and SD2 of the present liquid chemical formulation were prepared with MAKROLON 2608, 1-methylpyrrolidinone, and a water scavenger consisting of acetic anhydride. Specifically, a solution having approximately 10% MAKROLON 2608 by mass was formed by mixing 470 g of MAKROLON 2608 into 4,230 g of 1-methylpyrrolidinone. Samples SD1 and SD2 having approximately 0.5% and 1.0% acetic anhydride by mass were then formed by mixing 0.5 and 1.0 g of acetic anhydride respectively into 99.5 and 99 g of the MAKROLON 2608/1-methylpyrrolidinone solution. The remainder of the MAKROLON 2608/1-methylpyrrolidinone solution, to which no water scavenger was added, was designated as baseline sample SD0.

Portions of samples SD0–SD2 were heated at 35° C. Further portions of samples SD0–SD2 were heated at 50° C. Viscosity was measured as a function of time for these heated portions of samples SD0–SD2. The viscosities of the portion s of water-scavenger containing samples SD1 and SD2 heated at 35° C. and 50° C. decreased with time but at a much slower rate, typically 2–10 times slower, than the rates at which viscosity decreased with time for the portions of baseline sample SD0 respectively heated at 35° C. and 50° C.

Experiment E—Copolycarbonates and 1-methylpyrrolidinone with Extrusion Coating

Three different samples SE1–SE3 are prepared with the bisphenol A/allylic cyclohexene bispolycarbonate of formula 5A and 1-methylpyrrolidinone by respectively mixing 1, 5, and 9 g of the bisphenol A/allylic cyclohexene bispolycarbonate of formula 5A into 99, 95, and 91 g of 1-methylpyrrolidinone. Each of samples SE1–SE3 is checked to see if all the bisphenol A/allylic cyclohexene bispolycarbonate of formula 5A has dissolved. For any of samples of SE1–SE3 in which the bisphenol A/allylic cyclohexene bispolycarbonate of formula 5A is not totally dissolved, the sample is heated at 35° C. for 24 hours and rechecked to see if all the bisphenol A/allylic cyclohexene bispolycarbonate of formula 5A has now dissolved. To the extent that the bisphenol A/allylic cyclohexene bispolycarbonate of formula 5A has totally dissolved in samples SE1–SE3, they constitute samples of the present liquid chemical formulation at polycarbonate mass concentrations of approximately 1, 5, and 10% of the liquid formulation. The kinematic viscosities of samples SE1–SE3 are measured.

Three different samples SE4–SE6 are prepared with the bisphenol A/allylic cyclohexene bispolycarbonate of formula 5B and 1-methylpyrrolidinone in the same way as samples SE1–SE3. Samples SE4–SE6 are subsequently processed in the same way as samples SE1–SE3. Using the bisphenol A/benzylic bispolycarbonate of formula 5C, three different samples SE7–SE9 are prepared and processed in the same way as samples SE1–SE3. Using the bisphenol A/tertiary bispolycarbonate of formula 5D, three different samples SE10–SE12 are prepared and processed in the same way as samples SE1–SE3.

Portions of samples SE1–SE12 which constitute the present liquid chemical formulation are subjected to accelerated aging to ascertain formulation shelf life and stability. The accelerated aging tests are performed by heating the sample portions at 35° C. and, while the sample portions continue to be heated, checking the portions at 1, 2, 3, 4, 5, and 6 weeks. Additional portions of samples SE1–SE12 which constitute the present liquid formulation are subjected to further accelerated aging by heating these sample portions at 50° C. and, while the sample portions continue to be heated, checking them at 1, 2, 3, 4, 5, 6, 7, 14, and 21 days.

Further portions of samples SE1–SE12 which constitute the present liquid chemical formulation are subjected to refrigeration to assess thermodynamic stability of the formulation. The refrigeration tests are conducted by refrigerating the sample portions at 5° C. for two months.

Portions of those samples SE1–SE12 which achieve full polycarbonate dissolving and survive the accelerated aging and refrigeration tests are deposited by extrusion coating on corresponding ones of the chromium-coated glass substrates. The resulting liquid films are then processed as generally described in Experiment C to produce corresponding annealed solid polycarbonate films. Using a Dektak film measurement system, the thicknesses of the solid films are measured.

Experiment F—MAKROLON 2608 and 1-methylpyrrolidinone with Spin Coating

Four different samples SF1–SF4 of the present liquid chemical formulation were prepared with MAKROLON 2608 polycarbonate and 1-methylpyrrolidinone to achieve respective polycarbonate mass concentrations of approximately 2, 5, 7 and 9% of the liquid chemical formulation. Specifically, 0.44, 1.04, 1.55 and 2.06 g of MAKROLON 2608 were respectively mixed with 20.6, 20.6, 20.6 and 20.5 g of dried 1-methylpyrrolidinone until formulations SF1–SF4 were respectively formed as stable solutions at 21.4, 50.4, 75.3 and 100.4 g polycarbonate/kg 1-methylpyrrolidinone. The kinematic viscosities of formulations SF1–SF4 were respectively measured at 2.3, 4.8, 7.7 and 14.3 centistokes. FIG. 2 presents the kinematic viscosity data for formulations SF1–SF4 along with the kinematic viscosity data for formulations SA1–SA5, also having MAKROLON 2608 as the polycarbonate material, but utilizing pyridine as the polycarbonate solvent rather than 1-methylpyrrolidinone.

5-ml portions of formulations SF1–SF4 were respectively spun onto four of the chromium-coated glass substructures for 60 sec. at respective spin speeds of 750, 1000, 1500 and 2000 rpm to produce liquid films from formulations SF1–SF4. After thermally processing the liquid films in the manner specified in Experiment A, the thicknesses of the resultant four annealed solid polycarbonate films created from formulations SF1–SF4 were respectively measured at 730, 370, 340 and 310 nm.

Experiment G—MAKROLON 2608 and Polycarbonate Solvents other than Pyridine and 1-methylpyrrolidinone 21 different samples SG1–SG21 of the present liquid chemical formulation are prepared with MAKROLON 2608 polycarbonate and polycarbonate solvents other than pyridine and 1-methylpyrrolidinone to achieve polycarbonate mass concentrations of approximately 5% of the liquid chemical formulation. Specifically, each of formulations SG1–SG21 is formed by mixing 0.8 g of MAKROLON 2608 with 15.0 g of a different one of the 21 polycarbonate solvents using standard mixing/homogenization techniques until a stable solution of each of formulations SG1–SG21 is formed at 53.3 g polycarbonate/kg polycarbonate solvent. The kinematic viscosities of formulations SG1–SG21 are measured.

The 21 polycarbonate solvents for formulations SG1–SG21 respectively are 4-ethylpyridine, 2,3-dimethylpyridine, 3,4-dimethylpyridine, 2-ethyl-4-methylpyridine, 3-ethyl-4-methylpyridine, 5-ethyl-2-methylpyridine, 2-isopropylpyridine, 2-n-propylpyridine, 3-phenylpyridine, 2-fluoropyridine, 2-chloropyridine, 2-bromopyridine, 4-methoxypyridine, 1-methylpyrrole, 2,4-dimethylpyrrole, 2-isopropylpyrrole, 1-propylpyrrole, 1-butylpyrrole, 1-tert-butylpyrrole, 1-ethyl-2-pyrrolidinone, and 1-cyclohexylpyrrolidinone.

5-ml portions of formulations SG1–SG21 are respectively spun onto 21 of the chromium-coated glass substructure s for 30 sec. at 1,000 rpm to produce 21 liquid films of formulations SG1–SG21. The 21 liquid films are then thermally processed as specified in Experiment A or C to respectively produce 21 annealed solid polycarbonate films. Using a Dektak film thickness measurement system, the thicknesses of the 21 solid polycarbonate films created from formulations SG1–SG21 are measured.

Aperture Formation

Figure 7:
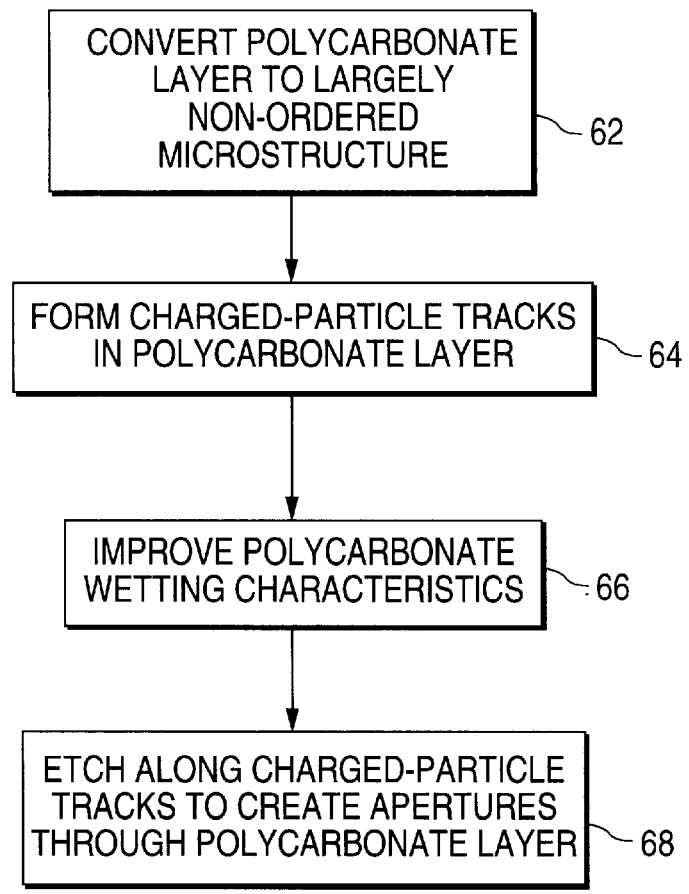
FIG. 7 is a flow chart of a set of processing steps performable on the polycarbonate film of FIG. 3 for providing the film with apertures in accordance with the invention.

FIG. 7 presents a flow chart of process steps by which etching of charged-particle tracks is employed to create apertures in a solid polycarbonate film or layer made by the process of FIG. 3. The track-etching uniformity is greatly improved when the polycarbonate film has a largely amorphous (non-ordered) microstructure with stress relieved and with crystallinity at a minimum. Block 62 in FIG. 7 basically repeats block 29 of FIG. 3 for converting the microstructure of the solid polycarbonate film to a largely amorphous, stress-relieved state.

The polycarbonate film and the underlying substructure are now subjected to a beam of energetic charged particles that strike the top of the film in a direction generally perpendicular to the upper polycarbonate surface. The charged particles have sufficient energy to pass through the polycarbonate film and form straight tracks at random locations across the film. See block 64. The charged-particle tracks constitute damaged polycarbonate zones along the particle paths. More particularly, each charged-particle track consists of a highly damaged core surrounded by a less damaged region that transitions into undamaged polycarbonate material. The highly damaged polycarbonate core of each charged-particle track is typically 4–10 nm in diameter and consists of cleaved polycarbonate molecules, including the solid reaction byproducts.

The charged-particle tracks extend substantially parallel to one another. Although the charged-particle tracks are randomly located across the polycarbonate track (or track-forming) film, the tracks have a well-defined average spacing. For an average track spacing of 1 $\mu$m, the track density is approximately $10^8$ tracks/$cm^2$.

A charged-particle accelerator that forms a well-collimated beam of ions is utilized to form the charged-particle tracks. The ion beam is scanned uniformly across the top of the polycarbonate film. The charged-particle species is normally argon ionized from one ($Ar^+$) to eleven ($Ar^{11+}$) times at an energy of 0.2 to 20 MeV. Preferably, the charged-particle species is $Ar^{9+}$, $Ar^{10+}$ or $Ar^{11+}$ at 2 MeV. The charged-particle species can alternatively be quadruply ionized xenon ($Xe^{4+}$) at an energy of 16 MeV. The charged-particle tracks can also be created from a collimated source of nuclear fission particles produced, for example, from Californium 252.

An operation that improves the wetting characteristics of the upper surface of the polycarbonate track film is usually performed at this point. See block 66. In particular, the chemical nature of the polycarbonate film along its upper surface is changed so that the wetting characteristics are substantially uniform along the entire upper polycarbonate surface. This facilitates later etching along the charged-particle tracks to form apertures through the track film, and thereby results in more uniform apertures.

The operation to improve the wetting characteristics is typically performed by subjecting the polycarbonate film to a plasma to remove a selected thickness of the film along its upper surface. The plasma is preferably an oxygen plasma at a power in the vicinity of 100 W. With the film and underlying structure situated on a platen at 60° C., the film is preferably subjected to the oxygen plasma for 20 sec. to remove approximately 30 nm of polycarbonate material.

An operation that modifies the chemical properties of the polycarbonate track film can also be performed on the track film to help reduce the time needed to create the apertures through the film along the charged-particle tracks. Typically, this operation entails exposing the film to ultraviolet light. Alternatively, the film can be exposed to ozone.

An etch is now performed along the charged-particle tracks to create straight parallel apertures through the polycarbonate track film as indicated in block 68. In particular, the damaged polycarbonate material which forms the tracks is removed by bringing the film into contact with a suitable chemical etchant, typically a solution of potassium hydroxide, that attacks the damaged polycarbonate material much more than the undamaged polycarbonate material. When the polycarbonate material consists of copolycarbonate in which primary repeat unit $A_l$ is bisphenol A carbonate repeat unit and further repeat unit $A_p$ is a carbonate repeat unit having a lower minimum homolytic bond cleavage energy than bisphenol A carbonate repeat unit, the selectivity of the etchant for attacking the damaged polycarbonate material is greater than what would arise if the polycarbonate material consisted solely of bisphenol A homopolycarbonate. The etchant preferably does not significantly attack the substructure underlying the polycarbonate film.

The etchant is normally at an elevated temperature during the polycarbonate etch. As part of the etch procedure, the polycarbonate film (including the underlying substructure) is preferably raised to approximately the same temperature as the etchant prior to subjecting the polycarbonate film to the etchant. This is done to avoid thermal shock, to avoid changing the temperature of the etchant, and to provide better control over the temperature-dependent etch rate. When a potassium hydroxide solution is employed to etch the damaged material along the charged-particle tracks, the etchant/polycarbonate temperature is typically 35° C.

The highly damaged polycarbonate cores, again typically 4–10 nm in diameter, of the charged-particle tracks are removed rapidly during the etch, normally without significant etching of exposed undamaged polycarbonate material, especially when the polycarbonate material consists of a bisphenol A-containing copolycarbonate of the type described above. The etch rate selectivity of the highly damaged polycarbonate cores to the undamaged polycarbonate material is very high, typically on the order of 10,000 to 1. The etch is continued into the lesser damaged polycarbonate regions surrounding the highly damaged cores, and typically through the lesser damaged regions into the surrounding undamaged polycarbonate material as the lateral etch rate progressively drops to that of undamaged polycarbonate material. The apertures formed through the polycarbonate film along the charged-particle tracks normally reach an average diameter of 0.1–2.0 $\mu$m, preferably 0.1–0.3 $\mu$m, typically 0.12–0.16 $\mu$m.

Some of the polycarbonate material along the upper surface of the track layer is removed during the etch process, especially during the etching of the lesser damaged and undamaged polycarbonate material. As a result, the thickness of the polycarbonate film is reduced, typically by 0.1–0.3 $\mu$m. In general, to get a desired final track layer thickness, the thickness of the track film directly after the plasma operation must exceed the desired final track film thickness by approximately 50% of the desired diameter of the apertures through the film. For example, a 500-nm post-plasma polycarbonate track film thickness is needed to achieve a 400-nm final track film thickness with 200-nm apertures.

The entire polycarbonate etch to form the apertures along the charged-particle tracks is normally performed with the same etchant. Alternatively, the etching of the lesser damaged polycarbonate regions and the undamaged polycarbonate material surrounding the lesser damaged regions can be performed with a different etchant than that used to remove the highly damaged cores of the charged-particle tracks. In any case, the etch occurs in a substantially uniform manner in the lateral direction—i.e., perpendicular to the charged-particle tracks. Accordingly, the final straight parallel apertures through the polycarbonate film are respectively centered on the locations of the charged-particle tracks.

Figure 8A:
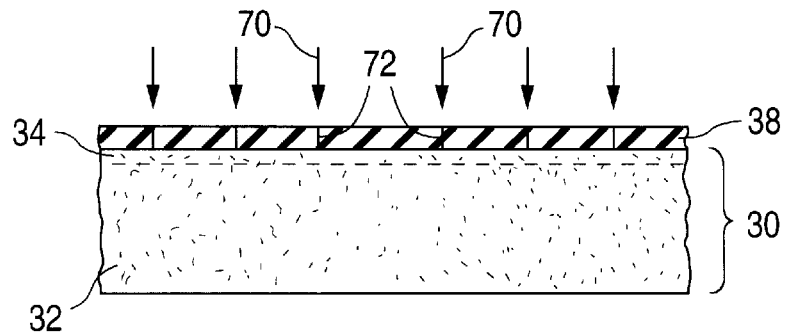
FIGS. 8a and 8b are cross-sectional views illustrating operations performable on the structure of FIG. 6d for providing a polycarbonate film with apertures according to the further processing steps of FIG. 7.
Figure 8B:
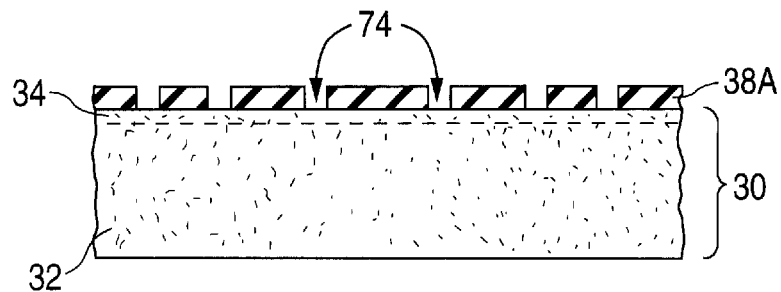

FIGS. 8a and 8b (collectively "FIG. 8") pictorially illustrate the formation and etching of the charged-particle tracks starting from the structure of FIG. 6d at a point subsequent to the drying operation and the transformation of solid polycarbonate film or layer 38 into a largely non-ordered microstructure. In FIG. 8a, charged particles 70 impinge perpendicularly on polycarbonate film 38 to form charged-particle tracks 72 through film 38. FIG. 8b illustrates the polycarbonate etch along charged-particle tracks 72 to create corresponding apertures 74 through layer 38. Item 38A in FIG. 8b is the reduced-thickness remainder of polycarbonate film 38.

Electron Emitter Fabrication and Operation

In a typical application, track apertures 74 are employed in defining the locations for creating electron-emissive elements in an electron-emitting device suitable, for example, for a cathode-ray tube of the flat-panel type. Apertures 74 can be utilized in a variety of ways to create electron-emissive elements. For example, see U.S. Pat. Nos. 5,559,389 and 5,564,959, the contents of which are incorporated by reference herein.

Electron-emissive elements can be formed directly in apertures 74, polycarbonate layer 38A thereby typically serving as an inter-electrode dielectric in a gated electron emitter. Alternatively, apertures 74 can be used to define openings in an underlying gate electrode layer for a gated electron emitter. FIGS. 9a–9c (collectively "FIG. 9") illustrate part of the steps in an example of. the latter fabrication process.

Substructure 30 in the process of FIG. 9 consists of a substrate 80, a lower electrically non-insulating emitter region 82, an electrically insulating layer 84, and an electrically non-insulating gate electrode layer 86 as indicated in FIG. 9a. Substrate 80 is formed with electrically insulating material, at least along its upper surface. Although not explicitly depicted in FIG. 9a, lower non-insulating emitter region 82 preferably consists of a lower electrically conductive layer, typically metal, and an upper electrically resistive layer. At least the lower conductive layer is typically patterned into a group of parallel emitter-electrode lines referred to as row electrodes. When emitter region 82 is configured in this way, the final field-emission structure is particularly suitable for selectively exciting phosphors in a flat-panel display. Nonetheless, region 82 can be arranged in various other patterns, or can even be unpatterned.

Depending on considerations such as the desired shape of the electron-emissive elements (e.g., conical or filamentary), it may or may not be necessary (or advantageous) to provide inter-electrode dielectric layer 84 with charged-particle tracks corresponding to tracks 72 in track layer 38A.

If there is no need to provide dielectric layer 84 with such tracks, candidate materials for dielectric layer 84 range from (a) electrical insulators which are trackable—i.e., readily provide straight parallel charged-particle tracks when suitably bombarded with charged particles—and for which etchants having a high damaged-material-to-undamaged-material etch selectivity are available to (b) electrical insulators which are substantially non-trackable or/and for which etchants that provide high damaged-material-to-undamaged-material etch selectivity are not readily available. For example, in such a case, dielectric layer 84 typically consists of silicon oxide deposited by chemical vapor deposition. While silicon oxide is relatively trackable, it is difficult to etch parallel straight apertures through silicon oxide along charged-particle tracks.

If it is necessary (or desirable) to provide inter-electrode dielectric layer 84 with such tracks, dielectric layer 84 is typically formed with an electrical insulator, such as polycarbonate, which is trackable and for which an etchant (e.g., a potassium hydroxide solution) that provides a high damaged-material-to-undamaged-material etch selectivity is available. FIG. 9a depicts this case. The charged particles which produced tracks 72 in polycarbonate track film 38 (now track film 38A) then also produce corresponding charged-particle tracks 88 through insulating layer 84. Each charged-particle track 88 was in line with corresponding charged-particle track 72 and thus now centers on corresponding aperture 74.

Gate electrode layer 86 typically consists of metal such as chromium or tantalum. Gate layer 86 may be patterned into a group of gate lines running perpendicular to the emitter row electrodes of lower non-insulating region 82. The gate lines then serve as column electrodes. With suitable patterning being applied to gate layer 86, the field emitter may alternatively be provided with separate column electrodes that contact portions of gate layer 86 and extend perpendicular to the row electrodes. This gate patterning and (when included) column-electrode formation may be done prior to the stage shown in FIG. 9a or at a later point in the fabrication process.

In a typical procedure for patterning gate layer 86 and providing separate column electrodes, the following steps are performed prior to the stage shown in FIG. 9a. A blanket layer of a column metal such as chromium or nickel is deposited on top of inter-electrode dielectric layer 84. The column metal is typically nickel deposited to a thickness of 15–250 nm. Using a suitable photoresist mask, the column metal is patterned into laterally separated parallel column electrodes. In patterning the column metal, openings are also formed through the column electrodes at the desired locations for gate portions that are to contact dielectric layer 84.

Next, a blanket layer of gate metal is deposited on top of the structure, including into the openings in the column electrodes. The gate metal is typically chromium deposited to a thickness of 20–50 nm. Using a suitable photomask, the gate metal is patterned to produce gate electrode layer 86. The gate metal removed during this step includes portions corresponding to the column metal portions removed to define the outer edges of the column electrodes. Apertures 74 in polycarbonate track layer 38 are then formed utilizing the charged-particle track formation/etching procedure described above to produce the structure of FIG. 9a.

Using polycarbonate track layer 38A as an etch mask, gate electrode layer 86 is etched through apertures 74 to form corresponding openings 90 through gate electrode 8 FIG. 9b depicts the structure at this point. Item 86A is the remainder of gate layer 86. Each gate opening 90 is in line with corresponding aperture 74 in track layer 38A. For the exemplary case in which the etch is performed anisotropically, each gate opening 90 is approximately the same size as corresponding aperture 74. The gate-layer etch is typically performed with a high-density plasma according to the procedure disclosed in Brigham et al, U.S. patent application Ser. No. 08/808,364, filed Feb. 28, 1997, now U.S. Pat. No. 5,972,235.

Polycarbonate layer 38A is removed at some point in the process. The latest point for removing layer 38A depends on how gate electrode 86A is utilized and processed. FIG. 9c illustrates the typical case in which track layer 38A is removed directly after forming gate openings 90.

The structure of FIG. 9c can be employed to form electron-emissive elements of various shapes. FIGS. 10a–10c (collectively "FIG. 10") illustrate how filamentary electron-emissive elements are created from the structure of FIG. 9c. FIGS. 11a–11c (collectively "FIG. 11") present an example in which the structure of FIG. 9c is utilized to create conical electron-emissive elements. The following material presents a brief description of the steps for creating filamentary and conical electron-emissive elements according to the further steps of FIGS. 10 and 11. Additional information is given in U.S. Pat. Nos. 5,559,389 and 5,564,959 cited above.

Referring to the processing steps of FIG. 10, an etch is performed along charged-particle tracks 88 to produce pores 92 through inter-electrode dielectric layer 84. The average diameter of pores 92 is considerably less than the average diameter of apertures 74 through track layer 38A. When insulating layer 84 consists of polycarbonate material, pores 92 can be created according to the same procedure used to create apertures 74, except that the polycarbonate etch is performed for a shorter duration. See FIG. 10a in which item 84A is the remainder of insulating layer 84.

Electrically non-insulating emitter filament material, typically metal, is electrochemically deposited into pores 92 to form corresponding electron-emissive filaments 94 that contact lower non-insulating region 82 as shown in FIG. 10b. Using patterned gate electrode layer 86A as an etch mask, the exposed portions of insulating track layer 84A are etched to form cavities 96 that respectively surround electron-emissive filaments 94. See FIG. 10c. The upper ends of filaments 94 are electropolished and sharpened to produce sharpened electron-emissive elements 94A.

Finally, the edges of gate electrode 86A may be rounded by performing an electropolishing step. FIG. 10c depicts the resultant structure for the case in which the electropolishing step is performed on gate electrode 86A. Items 84B and 86B are the respective remainders of polycarbonate track layer 84A and patterned gate electrode 86A in the structure of FIG. 10c.

In the further processing steps of FIG. 11, patterned gate layer 86A is used as an etch mask for etching the portions of insulating layer 84 exposed through gate openings 90 to form corresponding dielectric open spaces (or cavities) 100 as shown in FIG. 11a. The etch typically consists of a plasma etch step followed by a chemical etch step. Each dielectric open space 100 extends down to lower non-insulating region 82 and is vertically aligned with corresponding gate opening 90. Item 84C in FIG. 11a is the remainder of inter-electrode insulating layer 84.

A lift-off layer 102 is formed on gate layer 86A by evaporatively depositing a suitable lift-off material such as aluminum at a low angle, typically in the vicinity of 15–300, relative to the upper surface of gate layer 86A. See FIG. 11b. Electrically non-insulating emitter cone material, typically a metal such as molybdenum, is evaporatively deposited on top of lift-off layer 102 and through gate openings 90 into dielectric open spaces 100. The cone material deposition is typically performed approximately perpendicular to the upper surface of gate layer 86A.

As the emitter cone material accumulates on lift-off layer 102, the openings through which the cone material enters dielectric open spaces 100 progressively close. The cone material deposition is performed for a time sufficiently long to achieve full closure. The cone material thereby forms conical electron-emissive elements 104A respectively in dielectric open spaces 100. A continuous layer 104B of the cone material simultaneously accumulates on top of the structure as shown in FIG. 11b.

A lift-off etch is performed, typically with a chemical etchant, to remove lift-off layer 102 and overlying cone-material layer 104B. The edges of gate electrode 86A can be electropolished to round the gate edges. FIG. 11c shows the resultant structure for the case in which the electropolishing step is performed. Item 86C is the remainder of gate electrode 86A. Each conical electron-emissive element 104A is approximately centered in corresponding dielectric open space 100 and extends close to corresponding gate opening 90, preferably protruding into the center of corresponding opening 90.

The formation of lift-off layer 102 can be deleted from the emitter fabrication process. In that case, cone-material layer 104B is typically removed electrochemically. Techniques for electrochemically removing layer 104B without significantly damaging electron-emissive elements 104A are described in (a) U.S. Pat. Nos. 5,766,446 and 5,893,967, (b) Porter et al, U.S. patent application Ser. No. 08/884,701, filed Jun. 30, 1997, now U.S. Pat. No. 6,120,674, and (c) Knall et al, U.S. patent application Ser. No. 08/940,357, filed Sep. 30, 1997, now U.S. Pat. No. 6,007,695.

Figure 12:
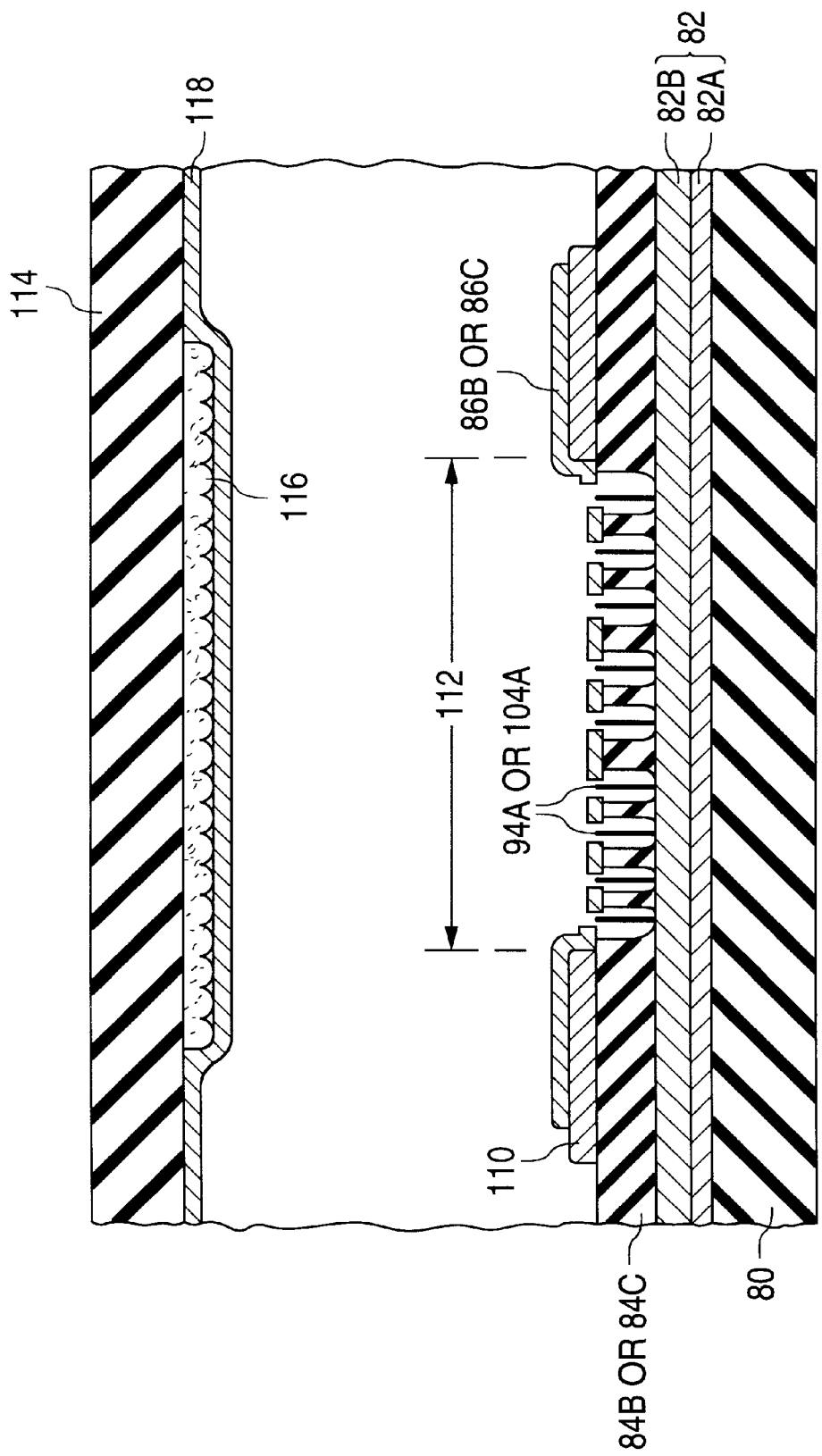
FIG. 12 is a cross-sectional view of a flat-panel CRT display that incorporates a gated field emitter, such as that of FIG. 10c or 11c, fabricated according to the invention.

FIG. 12 depicts a typical example of the core active region of a flat-panel CRT display that employs an area field emitter, such as that of FIG. 10c or 11c, manufactured according to the invention. Substrate 80 forms the backplate for the CRT display. Lower non-insulating region 82 is situated along the interior surface of backplate 80 and consists of electrically conductive layer 82A and overlying electrically resistive layer 82B.

Column electrodes 110, which extend perpendicular to the plane of FIG. 12, underlie portions of gate layer 86B or 86C. One column electrode 110 is depicted in FIG. 12. Column-electrode apertures 112, one of which is shown in FIG. 12, extend through column electrodes 110. Each column-electrode aperture 112 exposes a multiplicity of electron-emissive elements 94A or 104A.

A transparent, typically glass, faceplate 114 is located across from backplate 80. Light-emitting phosphor regions 116, one of which is shown in FIG. 12, are situated on the interior surface of faceplate 114 directly across from corresponding column-electrode aperture 112. A thin light-reflective layer 118, typically aluminum, overlies phosphor regions 116 along the interior surface of faceplate 114. Electrons emitted by electron-emissive elements 94A or 104A pass through light-reflective layer 118 and cause phosphor regions 116 to emit light that produces an image visible on the exterior surface of faceplate 114.

The core active region of the flat-panel CRT display typically includes other components not shown in FIG. 12. For example, a black matrix situated along the interior surface of faceplate 114 typically surrounds each phosphor region 116 to laterally separate it from other phosphor regions 116. A focusing system provided over interelectrode dielectric layer 84B or 84C help control the electron trajectories. Spacer walls are typically utilized to maintain a relatively constant spacing between backplate 80 and faceplate 114.

When incorporated into a flat-panel display of the type illustrated in FIG. 12, a field emitter manufactured according to the invention operates in the following way. Light-reflective layer 118 serves as an anode for the field-emission cathode. The anode is maintained at high positive voltage relative to the gate and emitter lines.

When a suitable voltage is applied between (a) a selected one of the emitter row electrodes in lower non-insulating region 82 and (b) a selected one of the column electrodes that are formed with or contact portions of gate layer 86B or 86C, the so-selected gate portion extracts electrons from the electron-emissive elements at the intersection of the two selected electrodes and controls the magnitude of the resulting electron current. Upon being hit by the extracted electrons, phosphor regions 116 emit light.

Variations

Directional terms such as "lower" and "upper" have been employed in describing the present invention to establish a frame of reference by which the reader can more easily understand how the various parts of the invention fit together. In actual practice, the components of a field emitter may be situated at orientations different from that implied by the directional terms used here. The same applies to the ways in which the fabrication steps are performed in the invention. Inasmuch as directional terms are used for convenience to facilitate the description, the invention encompasses implementations in which the orientations differ from those strictly covered by the directional terms employed here.

The various electron-emissive elements and charged-particle tracks (or track segments) have longitudinal axes (not shown). Each electron-emissive element is generally symmetric about its longitudinal axis. A reference to an etch as being performed along a charged-particle track through a track layer means that the removed material occupies a volume containing at least part of the track's longitudinal axis in the track layer.

While the invention has been described with reference to particular embodiments, this description is solely for the purpose of illustration and is not to be construed as limiting the scope of the invention claimed below. For example, the process flow of FIGS. 3 and 6 can be modified in various ways. Instead of forming liquid film 36A according to any of the spin, extrusion-spin, and meniscus coating techniques described above, film 36A can be created by dipping substructure 30 into the liquid chemical formulation to form the liquid film. Alternatively, film 36A may be created by spraying, by spreading the liquid using a doctor blade or similar device, by screen printing, by a directed jet, by a plasma spray, by a photo-assisted spray, or by laminating on a dry film.

Certain polycarbonate solvents generally suitable for use in the present liquid chemical formulation oxidize to an unacceptable degree during storage of the formulation, thereby reducing the useful storage life of the formulation. 1-methylpyrrolidinone is such an oxidizable polycarbonate solvent. Oxidation typically occurs due to the formation of free radicals when the formulation is exposed to oxygen or a reactive metal surface.

A stabilizer—e.g., 4-tert-butylcatechol or quinone in the case of 1-methylpyrrolidinone—can be employed in the present polycarbonate-containing liquid chemical formulation to inhibit oxidation of the polycarbonate solvent. The stabilizer typically operates by acting preferentially with the free radicals to form stable unreactive products. The stabilizer is employed at a low concentration, typically less than 0.0001% by mass (100 parts per million) of the formulation, and thus constitutes a minor component of the formulation.

The polycarbonate solvent in the liquid chemical formulation of the invention may, as indicated above, be formed with two or more polycarbonate-dissolving liquids. Aside from formulations formed with a principal solvent and a cosolvent respectively chosen, e.g., from the above-mentioned candidates for the principal and cosolvents, two or more of the polycarbonate-dissolving liquids can be chosen from the candidates for the principal solvent. For instance, cyclohexanone can be combined with 1-methylpyrrolidinone. The cosolvent, when used, can similarly be formed with two or more different polycarbonate-dissolving liquids other than the candidates for the principal solvent. A formulation having multiple polycarbonate-dissolving liquids can be utilized to improve the polycarbonate film-forming properties in extrusion coating applications or in making polycarbonate films of large surface area.

In a formulation having two candidates for the principal solvent, the solvent mix percentage for each solvent candidate can vary from less than 1% by mass of the formulation to more than 99% by mass of the formulation. For example, a two-solvent formulation may contain 1 part of pyridine to 2 parts 1-methylpyrrolidinone.

Two or more polycarbonates can similarly be employed to form the polycarbonate material in the present liquid chemical formulation. This includes homopolycarbonates with the same carbonate repeat units but significantly different dry molecular weights, repeat unit combinations of copolycarbonate and homopolycarbonate, and copolycarbonates with the same carbonate repeat units but different arrangements and/or numbers of the carbonate repeat units.

Substrate 80 can be deleted if lower non-insulating region 82 is a continuous layer of sufficient thickness to support the structure. Insulating substrate 80 can be replaced with a composite substrate in which a thin insulating layer overlies a relatively thick non-insulating layer that furnishes structural support.

The electron emitters produced according to the invention can be employed to make flat-panel devices other than flat-panel CRT displays. Various modifications and applications may thus be made by those skilled in the art without departing from the true scope and spirit of the invention as defined by the appended claims.

We claim:

1. A liquid chemical formulation comprising:
   polycarbonate material comprising copolycarbonate in which at least one carbonate repeat unit has free radical stabilization; and
   a liquid capable of dissolving the polycarbonate material to a concentration of at least 1% by mass of the liquid formulation at 20° C. and 1 atmosphere, the polycarbonate material being dissolved in the liquid.

2. A liquid formulation as in claim 1 wherein the polycarbonate material is present in the liquid at a higher mass fraction than any other constituent present in the liquid.

3. A liquid formulation as in claim 1 wherein the copolycarbonate constitutes at least 5% by mass of the polycarbonate material.

4. A liquid formulation as in claim 1 wherein the copolycarbonate constitutes at least 10% by mass of the polycarbonate material.

5. A liquid formulation as in claim 1 wherein the copolycarbonate constitutes more than 50% by mass of the polycarbonate material.

6. A liquid formulation as in claim 1 wherein the copolycarbonate comprises copolycarbonate molecules, each comprising:
   a primary carbonate component formed with repetitions of a primary carbonate repeat unit; and
   a further carbonate component formed with repetitions of at least one further carbonate repeat unit different from the primary repeat unit, each further repeat unit having a lower minimum homolytic bond cleavage energy than the primary repeat unit such that each further repeat unit undergoes decarboxylation more readily than the primary repeat unit.

7. A liquid formulation as in claim 6 wherein the primary carbonate components together constitute more than 50% by mass of the copolycarbonate.

8. A liquid formulation as in claim 7 wherein the primary carbonate components together constitute at least 80% by mass of the copolycarbonate.

9. A liquid formulation as in claim 7 wherein the primary repeat unit of each copolycarbonate molecule constitutes bisphenol A carbonate repeat unit.

10. A liquid formulation as in claim 9 wherein each further repeat unit of each copolycarbonate molecule constitutes a selected one of allylic cyclohexene, benzylic, and tertiary carbonate repeat units.

11. A liquid formulation as in claim 1 wherein the liquid is capable of dissolving the polycarbonate material to a concentration of at least 5% by mass of the liquid formulation at 20° C. and 1 atmosphere.

12. A liquid formulation as in claim 1 wherein the liquid has a boiling point of at least 80° C. at 1 atmosphere.

13. A liquid formulation as in claim 1 having no more than 1% water by mass of the liquid formulation.

14. A liquid formulation as in claim 1 wherein the copolycarbonate has a copolycarbonate core representable as:

where:
p is a plural integer;
each $A_i$ is a different bivalent carbonate repeat unit for i being an integer varying from 1 to p; and
n is a multiplicity indicator indicating that each carbonate repeat unit $A_i$ occurs multiple times in the copolycarbonate core.

15. A liquid chemical formulation comprising:
polycarbonate material;
a liquid capable of dissolving the polycarbonate material to a concentration of at least 1% by mass of the liquid formulation at 20° C. and 1 atmosphere, the polycarbonate material being dissolved in the liquid; and
a water scavenger.

16. A liquid formulation as in claim 15 wherein the polycarbonate material is present in the liquid at a higher mass fraction than any other constituent present in the liquid.

17. A liquid formulation as in claim 15 wherein the liquid has a boiling point of at least 80° C. at 1 atmosphere.

18. A liquid formulation as in claim 15 having no more than 1% water by mass of the liquid formulation.

19. A liquid formulation as in claim 15 wherein the polycarbonate material comprises copolycarbonate.

20. A liquid formulation as in claim 15 wherein at least one carbonate repeat unit in the polycarbonate material has free radical stabilization.

21. A liquid chemical formulation comprising:
polycarbonate material comprising copolycarbonate; and
a liquid comprising a principal solvent which consists of at least one of pyridine, a ring-substituted pyridine derivative, pyrrole, a ring-substituted pyrrole derivative, pyrrolidine, a pyrrolidine derivative, and cyclohexanone, the polycarbonate material being dissolved in the liquid.

22. A liquid formulation as in claim 21 wherein the polycarbonate material is present in the liquid at a higher mass fraction than any other constituent present in the liquid.

23. A liquid formulation as in claim 21 wherein the copolycarbonate constitutes at least 5% by mass of the polycarbonate material.

24. A liquid formulation as in claim 23 wherein the copolycarbonate constitutes at least 10% by mass of the polycarbonate material.

25. A liquid formulation as in claim 21 wherein the copolycarbonate constitutes more than 50% by mass of the polycarbonate material.

26. A liquid formulation as in claim 21 wherein at least one carbonate repeat unit in the copolycarbonate has free radical stabilization.

27. A liquid formulation as in claim 21 wherein the copolycarbonate comprises copolycarbonate molecules, each comprising:
a primary carbonate component formed with repetitions of a primary carbonate repeat unit; and
a further carbonate component formed with repetitions of at least one further carbonate repeat unit different from the primary repeat unit, each further repeat unit having a lower minimum homolytic bond cleavage energy than the primary repeat unit such that each further repeat unit undergoes decarboxylation more readily than the primary repeat unit.

28. A liquid formulation as in claim 27 wherein the primary carbonate components together constitute more than 50% by mass of the copolycarbonate.

29. A liquid formulation as in claim 28 wherein the primary carbonate components together constitute at least 80% by mass of the polycarbonate.

30. A liquid formulation as in claim 28 wherein the primary repeat unit of each copolycarbonate molecule constitutes bisphenol A carbonate repeat unit.

31. A liquid formulation as in claim 28 wherein each further repeat unit of each copolycarbonate molecule constitutes a selected one of allylic cyclohexene, benzylic, and tertiary carbonate repeat units.

32. A liquid formulation as in claim 21 wherein the liquid has a boiling point of at least 80° C. at 1 atmosphere.

33. A liquid formulation as in claim 21 wherein the copolycarbonate has a copolycarbonate core representable as:

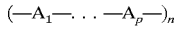

where:
p is a plural integer;
each $A_i$ is a different bivalent carbonate repeat unit for i being an integer varying from 1 to p; and
n is a multiplicity indicator indicating that each carbonate repeat unit $A_i$ occurs multiple times in the copolycarbonate core.

34. A liquid formulation as in claim 21 wherein both pyridine and the pyridine derivative are representable as:

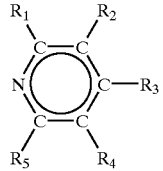

where:
N is nitrogen;
C is carbon; and
each $R_j$ is a monovalent covalent substituent, j being an integer varying from 1 to 5.

35. A liquid formulation as in claim 34 wherein at least two adjacent ones of $R_1$–$R_5$ form a fused ring or a derivative of a fused ring.

36. A liquid formulation as in claim 34 wherein each $R_j$ is a hydrogen atom, a deuterium atom, a hydrocarbon group, a substituted hydrocarbon group, an acetyl group, a carboxaldehyde group, a halogen, or a pseudo-halogen substituent.

37. A liquid formulation as in claim 21 wherein both pyrrole and the pyrrole derivative are representable as:

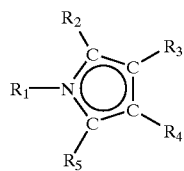

where:
N is a nitrogen atom;
C is a carbon atom; and
each $R_j$ is a monovalent covalent substituent, j being an integer varying from 1 to 5.

38. A liquid formulation as in claim 37 wherein at least two adjacent ones of $R_1$–$R_5$ form a fused ring or a derivative of a fused ring.

39. A liquid formulation as in claim 37 wherein each $R_j$ is a hydrogen atom, a deuterium atom, a hydrocarbon group, a substituted hydrocarbon group, an acetyl group, a carboxaldehyde group, a halogen, or a pseudo-halogen substituent.

40. A liquid formulation as in claim 21 wherein both pyrrolidine and the pyrrolidine derivative are generally representable as:

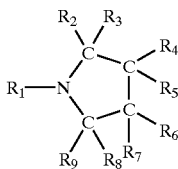

where:
N is a nitrogen atom;
C is a carbon atom;
each $R_j$ is a monovalent covalent substituent, j being an integer varying from 1 to 9, subject to any pair of $R_2$–$R_9$ on any of the carbon atoms being replaced with a single bivalent substituent double covalently bonded to that carbon atom, or/and up to one pair of $R_2$–$R_9$ on an adjacent pair of carbon atoms being replaced with a covalent bond between that pair of carbon atoms to create a double covalent bond therebetween, or/and $R_1$ and $R_2$ being replaced with a covalent bond between the nitrogen atom and the carbon atom bonded to $R_2$ to create a double covalent bond therebetween.

41. A liquid formulation as in claim 40 wherein each $R_j$ is a hydrogen atom, a deuterium atom, a hydrocarbon group, a substituted hydrocarbon group, an acetyl group, a carboxaldehyde group, a halogen, or a pseudo-halogen substituent.

42. A liquid formulation as in claim 21 wherein the liquid consists principally of 1-methylpyrrolidinone.

43. A liquid formulation as in claim 21 further including a non-chlorobenzene cosolvent, different from the principal solvent, for modifying at least one property of the liquid formulation.

44. A liquid formulation as in claim 43 wherein the cosolvent produces change in at least one of (a) boiling point of the liquid, (b) viscosity of the liquid formulation, (c) tact time of a liquid film created from the liquid formulation, (d) leveling of the liquid film, and (e) flammability characteristics of a solid film created from the liquid film.

45. A liquid chemical formulation comprising:
polycarbonate material; and
a liquid comprising (a) a principal solvent consisting of at least one of pyridine, a ring-substituted pyridine derivative, pyrrole, a ring-substituted pyrrole derivative, pyrrolidine, a pyrrolidine derivative, and cyclohexanone and (b) a non-chlorobenzene cosolvent, different from the principal solvent, for modifying at least one property of the liquid formulation, the polycarbonate material being dissolved in the liquid.

46. A liquid formulation as in claim 45 wherein the polycarbonate material is present in the liquid at a higher mass fraction than any other constituent present in the liquid.

47. A liquid formulation as in claim 45 wherein the cosolvent produces change in at least one of (a) boiling point of the liquid, (b) viscosity of the liquid formulation, (c) tact time of a liquid film created from the liquid formulation, (d) leveling of the liquid film, and (e) flammability characteristics of a solid film created from the liquid film.

48. A liquid formulation as in claim 45 wherein the cosolvent is present in the liquid at a lower mass fraction than the principal solvent.

49. A liquid formulation as in claim 45 wherein the cosolvent comprises at least one of methoxybenzene, ethyl lactate, cyclopentanone, mesitylene, and hexyl acetate.

50. A liquid formulation as in claim 45 wherein at least one carbonate repeat unit in the polycarbonate material has free radical stabilization.

51. A liquid chemical formulation comprising:
polycarbonate material;
a liquid comprising at least one of pyridine, a ring-substituted pyridine derivative, pyrrole, a ring-substituted pyrrole derivative, pyrrolidine, a pyrrolidine derivative, chlorobenzene, and cyclohexanone, the polycarbonate material being dissolved in the liquid; and
a water scavenger.

52. A liquid formulation as in claim 51 wherein the polycarbonate material is present in the liquid at a higher mass fraction than any other constituent present in the liquid.

53. A liquid formulation as in claim 51 having no more than 1% water by mass of the liquid formulation.

54. A liquid formulation as in claim 51 having no more than 0.1% water by mass of the liquid formulation.

55. A method comprising the steps of:
providing a liquid chemical formulation in which polycarbonate material comprising copolycarbonate is dissolved in a liquid capable of dissolving the polycarbonate material to a concentration of at least 1% by mass of the liquid formulation at 20° C. and 1 atmosphere, at least one carbonate repeat unit in the copolycarbonate having free radical stabilization;
forming a liquid film of the liquid formulation over a substructure; and
processing the liquid film to largely remove the liquid and convert the liquid film into a solid, largely polycarbonate film.

56. A method as in claim 55 wherein the polycarbonate material is present in the liquid at a higher mass fraction than any other constituent present in the liquid.

57. A method as in claim 55 wherein the copolycarbonate constitutes at least 5% by mass of the polycarbonate material.

58. A method as in claim 55 wherein the copolycarbonate constitutes at least 50% by mass of the polycarbonate material.

59. A method as in claim 55 wherein the liquid has a boiling point of at least 80° C. at 1 atmosphere.

60. A method as in claim 55 wherein the providing step comprises combining the liquid and the polycarbonate material in a substantially water-free environment.

61. A method as in claim 55 wherein the providing step includes introducing a water scavenger into the liquid.

62. A method as in claim 55 wherein the providing step includes drying the polycarbonate material and/or the liquid to remove water.

63. A method as in claim 55 wherein the forming step comprising extrusion coating at least part of the liquid formulation over the substructure.

64. A method as in claim 55 wherein the processing step includes annealing the solid film to relieve stress in the solid film.

65. A method as in claim 55 further including the steps of:
causing charged particles to pass into the solid film to form a multiplicity of charged-particle tracks at least partway therethrough; and creating corresponding apertures at least partway through the solid film by a procedure that entails etching the solid film along the charged-particle tracks.

66. A method as in claim 65 wherein the copolycarbonate comprises copolycarbonate molecules, each comprising:
a primary carbonate component formed with repetitions of a primary carbonate repeat unit; and
a further carbonate component formed with repetitions of at least one further carbonate repeat unit different from the primary repeat unit, each further repeat unit having a lower minimum homolytic bond cleavage energy than the primary repeat unit such that each further repeat unit undergoes decarboxylation more readily than the primary repeat unit.

67. A method as in claim 66 wherein the primary carbonate components constitute more than 50% by mass of the copolycarbonate.

68. A method as in claim 67 wherein the primary repeat unit of each copolycarbonate molecule constitutes bisphenol A carbonate repeat unit.

69. A method comprising the steps of:
providing a liquid chemical formulation in which polycarbonate material is dissolved in a liquid furnished with a water scavenger and capable of dissolving the polycarbonate material to a concentration of at least 1% by mass of the liquid formulation at 20° C. and 1 atmosphere;
forming a liquid film of the liquid formulation over a substructure; and
processing the liquid film to largely remove the liquid and convert the liquid film into a solid, largely polycarbonate film.

70. A method as in claim 69 wherein the polycarbonate material is present in the liquid at a higher mass fraction than any other constituent present in the liquid.

71. A method as in claim 69 wherein the providing step comprises:
introducing the water scavenger into the liquid; and
subsequently dissolving the polycarbonate material in the liquid.

72. A method as in claim 69 further including the steps of:
causing charged particles to pass into the solid film to form a multiplicity of charged-particle tracks at least partway therethrough; and
creating corresponding apertures at least partway through the solid film by a procedure that entails etching the solid film along the charged-particle tracks.

73. A method comprising the steps of:
providing a liquid chemical formulation in which polycarbonate material comprising copolycarbonate is dissolved in a liquid comprising a principal solvent which consists of at least one of pyridine, a ring-substituted pyridine derivative, pyrrole, a ring-substituted pyrrole derivative, pyrrolidine, a pyrrolidine derivative, and cyclohexanone;
forming a liquid film of the liquid formulation over a substructure; and
processing the liquid film to largely remove the liquid and convert the liquid film into a solid, largely polycarbonate film.

74. A method as in claim 73 wherein the polycarbonate material is present in the liquid at a higher mass fraction than any other constituent present in the liquid.

75. A method as in claim 73 wherein the copolycarbonate constitutes at least 5% by mass of the polycarbonate material.

76. A method as in claim 73 wherein the copolycarbonate constitutes at least 50% by mass of the polycarbonate material.

77. A method as in claim 73 wherein the liquid has a boiling point of at least 80° C. at 1 atmosphere.

78. A method as in claim 73 wherein the providing step comprises combining the liquid and the polycarbonate material in a substantially water-free environment.

79. A method as in claim 73 wherein the providing step includes introducing a water scavenger into the liquid.

80. A method as in claim 73 wherein the providing step includes drying the polycarbonate material and/or the liquid to remove water.

81. A method as in claim 73 wherein the forming step comprising extrusion coating at least part of the liquid formulation over the substructure.

82. A method as in claim 73 wherein the processing step includes annealing the solid film to relieve stress in the solid film.

83. A method as in claim 73 wherein the liquid further includes a non-chlorobenzene cosolvent, different from the principal solvent, for modifying at least one property of the liquid formulation.

84. A method as in claim 83 wherein the providing step comprises:
dissolving the polycarbonate material in the principal solvent; and
subsequently combining the cosolvent with the principal solvent including the dissolved polycarbonate material.

85. A method comprising the steps of:
providing a liquid chemical formulation in which polycarbonate material comprising copolycarbonate is dissolved in a liquid comprising at least one of pyridine, a ring-substituted pyridine derivative, pyrrole, a ring-substituted pyrrole derivative, pyrrolidine, a pyrrolidine derivative, chlorobenzene, and cyclohexanone;
forming a liquid film of the liquid formulation over a substructure;
processing the liquid film to largely remove the liquid and convert the liquid film into a solid, largely polycarbonate film;
causing charged particles to pass into the solid film to form a multiplicity of charged-particle tracks at least partway therethrough; and
creating corresponding apertures at least partway through the solid film by a procedure that entails etching the solid film along the charged-particle tracks.

86. A method as in claim 85 wherein the copolycarbonate comprises copolycarbonate molecules, each comprising:
a primary carbonate component formed with repetitions of a primary carbonate repeat unit; and
a further carbonate component formed with repetitions of at least one further carbonate repeat unit different from the primary repeat unit, each further repeat unit having a lower minimum homolytic bond cleavage energy than the primary repeat unit such that each further repeat unit undergoes decarboxylation more readily than the primary repeat unit.

87. A method as in claim 86 wherein the primary carbonate components constitute more than 50% by mass of the copolycarbonate.

88. A method as in claim 86 wherein the primary repeat unit of each copolycarbonate molecule constitutes bisphenol A carbonate repeat unit.

89. A method as in claim 85 further including the step of etching an electrically non-insulating layer of the substructure through the apertures to form corresponding openings in the non-insulating layer.

90. A method as in claim 89 further including the step of defining electron-emissive elements respectively centered approximately on the openings in the non-insulating layer.

91. A method as in claim 90 wherein (a) the non-insulating layer comprises a gate layer, (b) an electrically insulating layer is provided below the gate layer, and (c) a lower electrically non-insulating emitter region is provided below the insulating layer, the defining step comprising:

etching the insulating layer through the openings in the gate layer to form corresponding dielectric open spaces through the insulating layer down to the emitter region; and forming electron-emissive elements in the dielectric open spaces so as to contact the emitter region.

92. A method comprising the steps of:

providing a liquid chemical formulation in which polycarbonate material is dissolved in a liquid comprising (a) a principal solvent which consists of at least one of pyridine, a ring-substituted pyridine derivative, pyrrole, a ring-substituted pyrrole derivative, pyrrolidine, a pyrrolidine derivative, and cyclohexanone and (b) a non-chlorobenzene cosolvent, different from the principal solvent, for modifying at least one property of the liquid formulation;

forming a liquid film of the liquid formulation over a substructure; and processing the liquid film to largely remove the liquid and convert the liquid film into a solid, largely polycarbonate film.

93. A method as in claim 92 wherein the polycarbonate material is present in the liquid at a higher mass fraction than any other constituent present in the liquid.

94. A method as in claim 92 wherein the cosolvent produces change in at least one of (a) boiling point of the liquid, (b) viscosity of the liquid formulation, (c) tact time of a liquid film created from the liquid formulation, (d) leveling of the liquid film, and (e) flammability characteristics of a solid film created from the liquid film.

95. A method as in claim 92 wherein the providing step comprises:

dissolving the polycarbonate material in the principal solvent; and subsequently combining the cosolvent with the principal solvent including the dissolved polycarbonate material.

96. A method comprising the steps of:

providing a liquid chemical formulation in which polycarbonate material is dissolved in a liquid comprising (a) a principal solvent which consists of at least one of pyridine, a ring-substituted pyridine derivative, pyrrole, a ring-substituted pyrrole derivative, pyrrolidine, a pyrrolidine derivative, chlorobenzene, and cyclohexanone and (b) a cosolvent, different from the principal solvent, for modifying at least one property of the liquid formulation;

forming a liquid film of the liquid formulation over a substructure;

processing the liquid film to largely remove the liquid and convert the liquid film into a solid, largely polycarbonate film;

causing charged particles to pass into the solid film to form a multiplicity of charged-particle tracks at least partway therethrough; and creating corresponding apertures at least partway through the solid film by a procedure that entails etching the solid film along the charged-particle tracks.

97. A method comprising the steps of:

providing a liquid chemical formulation in which polycarbonate material is dissolved in a liquid furnished with a water scavenger and comprising at least one of pyridine, a ring-substituted pyridine derivative, pyrrole, a ring-substituted pyrrole derivative, pyrrolidine, a pyrrolidine derivative, chlorobenzene, and cyclohexanone;

forming a liquid film of the liquid formulation over a substructure; and processing the liquid film to largely remove the liquid and convert the liquid film into a solid, largely polycarbonate film.

98. A method as in claim 97 wherein the polycarbonate material is present in the liquid at a higher mass fraction than any other constituent present in the liquid.

99. A method as in claim 97 wherein the providing step comprises:

introducing the water scavenger into the liquid; and subsequently dissolving the polycarbonate material in the liquid.

100. A method as in claim 97 wherein the water scavenger reacts with water in the liquid or/and the polycarbonate material to produce volatile species.

101. A liquid formulation as in claim 1 wherein the liquid has a protonated form whose acid dissociation constant is greater than $10^{-8}$ at 20° C. and 1 atmosphere.

102. A liquid formulation as in claim 15 wherein the liquid has a protonated form whose acid dissociation constant is greater than $10^{-8}$ at 20° C. and 1 atmosphere.

103. A liquid formulation as in claim 21 wherein the liquid has a protonated form whose acid dissociation constant is greater than $10^{-8}$ at 20° C. and 1 atmosphere.

104. A liquid formulation as in claim 45 wherein the liquid has a protonated form whose acid dissociation constant is greater than $10^{-8}$ at 20° C. and 1 atmosphere.

105. A liquid formulation as in claim 51 wherein the liquid has a protonated form whose acid dissociation constant is greater than $10^{-8}$ at 20° C. and 1 atmosphere.

106. A method as in claim 55 wherein the liquid has a protonated form whose acid dissociation constant is greater than $10^{-8}$ at 20° C. and 1 atmosphere.

107. A method as in claim 69 wherein the liquid has a protonated form whose acid dissociation constant is greater than $10^{-8}$ at 20° C. and 1 atmosphere.

108. A method as in claim 73 wherein the liquid has a protonated form whose acid dissociation constant is greater than $10^{-8}$ at 20° C. and 1 atmosphere.

109. A method as in claim 85 wherein the liquid has a protonated form whose acid dissociation constant is greater than $10^{-8}$ at 20° C. and 1 atmosphere.

110. A method as in claim 92 wherein the liquid has a protonated form whose acid dissociation constant is greater than $10^{-8}$ at 20° C. and 1 atmosphere.

111. A method as in claim 96 wherein the liquid has a protonated form whose acid dissociation constant is greater than $10^{-8}$ at 20° C. and 1 atmosphere.

112. A method as in claim 97 wherein the liquid has a protonated form whose acid dissociation constant is greater than $10^{-8}$ at 20° C. and 1 atmosphere.

* * * * *